United States Patent
Li et al.

(10) Patent No.: US 11,584,237 B2
(45) Date of Patent: Feb. 21, 2023

(54) MOBILE INTERNET-BASED INTEGRATED VEHICLE ENERGY REPLENISHMENT SYSTEM AND METHOD, AND STORAGE MEDIUM

(71) Applicant: NIO CO., LTD., Shanghai (CN)

(72) Inventors: Bin Li, Shanghai (CN); Lihong Qin, Shanghai (CN); Fei Shen, Shanghai (CN); Xin Zhou, Shanghai (CN); Jinxing Qiang, Shanghai (CN); Jianxing Zhang, Shanghai (CN); Xu He, Shanghai (CN); Xiang Ma, Shanghai (CN); Yicheng Wu, Shanghai (CN); Xiaobin Pan, Shanghai (CN)

(73) Assignee: NIO CO., LTD., Shanghai (CN)

( * ) Notice: Subject to any disclaimer, the term of this patent is extended or adjusted under 35 U.S.C. 154(b) by 662 days.

(21) Appl. No.: 16/485,338

(22) PCT Filed: Feb. 7, 2018

(86) PCT No.: PCT/CN2018/075525
§ 371 (c)(1),
(2) Date: Aug. 12, 2019

(87) PCT Pub. No.: WO2018/145633
PCT Pub. Date: Aug. 16, 2018

(65) Prior Publication Data
US 2020/0001727 A1    Jan. 2, 2020

(30) Foreign Application Priority Data

Feb. 10, 2017  (CN) .......................... 201710072621.4
May 11, 2017  (CN) .......................... 201710331565.1
May 11, 2017  (CN) .......................... 201720523132.1

(51) Int. Cl.
*B60L 50/62* (2019.01)
*B60L 53/60* (2019.01)
(Continued)

(52) U.S. Cl.
CPC ............... *B60L 50/50* (2019.02); *B60L 50/62* (2019.02); *G01C 21/3617* (2013.01); *G01C 21/3679* (2013.01); *H04W 72/0446* (2013.01)

(58) Field of Classification Search
CPC .......... B60K 15/00; B60K 2015/03197; B60K 2015/03217; B60L 3/0023; B60L 50/50;
(Continued)

(56) References Cited

U.S. PATENT DOCUMENTS

| | | | |
|---|---|---|---|
| 2014/0052368 A1* | 2/2014 | Varughese | G01C 21/3697 701/123 |
| 2018/0281613 A1* | 10/2018 | Yu | B60L 50/60 |
| 2018/0281614 A1* | 10/2018 | Hu | H02J 7/342 |

FOREIGN PATENT DOCUMENTS

| | | |
|---|---|---|
| CN | 103840549 | 6/2014 |
| CN | 104658292 | 5/2015 |

(Continued)

OTHER PUBLICATIONS

International Search Report and Written Opinion for International (PCT) Patent Application No. PCT/CN2018/075525, dated Feb. 7, 2018.

*Primary Examiner* — Peter D Nolan
*Assistant Examiner* — Ce Li Li
(74) *Attorney, Agent, or Firm* — Sheridan Ross P.C.

(57) ABSTRACT

Disclosed are a mobile Internet-based integrated vehicle energy replenishment system and method, and a storage medium. The energy replenishment system comprises a first terminal, a second terminal, an intelligent scheduling unit, and a resource management unit, and is configured for sending a valet energy replenishment request, allocating a
(Continued)

corresponding energy replenishment resource, issuing a valet energy replenishment service order, and guiding a valet energy replenishment service, wherein the first terminal comprises an energy replenishment reminding unit, a valet energy replenishment requesting unit, a vehicle authorization setting unit, and an order status displaying unit; the second terminal comprises a service personnel guiding unit, and an authorization activation unit; the intelligent scheduling unit comprises an energy replenishment resource scheduling unit, an energy replenishment type recommendation unit, a parking spot navigation unit, an automatic authorization unit, and an order generation unit; and the resource management unit comprises an energy replenishment resource management unit, and a vehicle management unit. According to the invention, energy replenishment demands of customers are effectively acquired, and thus service personnels and energy replenishment resources are scheduled much effectively; convenient and rapid energy replenishment of vehicles is achieved; and technical support is provided for the valet energy replenishment service.

5 Claims, 4 Drawing Sheets

(51) Int. Cl.
*G01C 21/36* (2006.01)
*H04W 72/04* (2009.01)
*B60L 50/50* (2019.01)
*H04W 72/0446* (2023.01)

(58) Field of Classification Search
CPC ........ B60L 50/60; B60L 50/62; B60L 53/305; B60L 53/32; B60L 53/57; B60L 53/65; B60L 53/665; B60L 53/68; B60L 2240/62; B60L 2240/622; B60L 2240/72; B60L 2240/80; B60L 2250/16; G01C 21/3617; G01C 21/3679; G01C 21/3697; G06Q 10/06315; G06Q 30/0639; G06Q 50/06; H02J 50/80; H02J 7/007; Y02T 10/62; Y02T 10/70; Y02T 10/7072; Y02T 10/72; Y02T 90/12; Y02T 90/14; Y02T 90/16; Y02T 90/167; Y02T 90/169
See application file for complete search history.

(56) References Cited

FOREIGN PATENT DOCUMENTS

| | | |
|---|---|---|
| CN | 106372733 | 2/2017 |
| WO | WO 2011/158547 | 12/2011 |
| WO | WO 2014/027690 | 2/2014 |

* cited by examiner

MOBILE INTERNET-BASED INTEGRATED VEHICLE ENERGY REPLENISHMENT SYSTEM AND METHOD, AND STORAGE MEDIUM

CROSS REFERENCE TO RELATED APPLICATIONS

This application is a national stage application under 35 U.S.C. 371 and claims the benefit of PCT Application No. PCT/CN2018/075525 having an international filing date of 7 Feb. 2018, which designated the United States, which PCT application claimed the benefit of China Patent Application No. 201710072621.4 filed 10 Feb. 2017; China Patent Application No. 201710331565.1 filed 11 May 2017, and China Patent Application No. 201720523132.1 filed 11 May 2017, the disclosure of each of which are incorporated herein by reference.

TECHNICAL FIELD

The invention relates to the field of vehicle energy replenishment, and specifically relates to a mobile Internet-based integrated vehicle energy replenishment system and method, and a storage medium.

BACKGROUND ART

In recent years, under the drive of market demands and with the support of government policies, the research, development, manufacturing and market of new energy vehicles have entered a new development period. Consumers are becoming more and more acquainted with a new thing like new energy vehicles. The experience of charging the new energy vehicles has always been one of the biggest pain points criticized by the consumers, however. Although in recent years, charging piles have sprung up in residential areas, office buildings, shopping centers, etc., the user's pain point of the poor experience of charging the new energy vehicles has not been completely addressed for various reasons.

Problem 1: Specificity of Charging Piles

Due to the scarcity of parking resources in the residential areas, etc., most of the users of new energy vehicles cannot deploy charging piles with their own private attributes.

Problem 2: Availability of Public Charging Piles Cannot be Guaranteed

The availability of the charging piles cannot be guaranteed, wherein the availability here includes three aspects:

(1) the parking spot to which a charging pile is allocated is available (i.e., not occupied by other vehicles);

(2) the charging pile itself is idle (i.e. not in use); and (3) the charging pile itself is usable (i.e., having no functional defects).

Nowadays, the most common approach to find a charging pile is to get recommendation and navigation from a charging pile operator or an App provided by a service provider. However, due to the problem of interconnectedness of the charging piles (including the parking spaces), a background operation system of the operator/service provider cannot get real-time state information of the charging piles in a timely manner, and therefore, it is impossible to present the real-time availability state of the charging piles at the user's client (i.e. App). It is conceivable that if a user of a new energy vehicle had been navigated to a certain charging pile by such an App but then was told that the charging pile cannot be used, his/her user experience would be very bad.

Problem 3: Duration of a Single Charging

Compared to the refueling of fuel vehicles, the duration of a single charging of the new energy vehicles is totally uncompetitive. The duration of the single charging is several tens of minutes if short, or several hours if long. Although, among today's operation modes, a mode such as power replenishment at destination is introduced (i.e., charging piles are deployed at some popular destinations to ensure that the vehicle is charged during idle time after the user arrives at the destination). However, due to the characteristics of the charging pile deployment spot, this mode cannot flexibly meet real-time charging requirements during periods of peaks and troughs appearing at the destination. In addition, due to the short parking resources in China's first- and second-tier cities, most of the owners of new energy vehicles cannot deploy their own charging piles in their residential areas.

The above three problems affecting the user's charging experience greatly affect the enthusiasm of the user to purchase a new energy vehicle. The aimless and disordered deployment of the charging piles cannot solve the foregoing pain point of the user in a short period of time, which also greatly affects the healthy development of the new energy vehicle industry.

The mobile Internet-based integrated system for new energy vehicle energy replenishment proposed in the invention directly refers to a solution to the aforementioned pain point, which can bring an excellent power replenishment experience to users of new energy vehicles.

SUMMARY OF THE INVENTION

In order to solve the above problem in the prior art, that is, to solve the problem of convenience in energy replenishment of the new energy vehicles, the invention proposes a mobile Internet-based integrated vehicle energy replenishment system and method, and a storage medium.

Solution 1. A mobile Internet-based integrated vehicle energy replenishment system, comprising a cloud platform, a scheduling policy center, and a resource management center, wherein the scheduling policy center is connected to the cloud platform, and is configured to provide an energy replenishment resource scheduling policy to the cloud platform;

the resource management center is connected to the cloud platform, and is configured to obtain and store basic information of energy replenishment resources, and provide latest working states of the energy replenishment resources to the cloud platform; and the cloud platform is configured to allocate an energy replenishment resource corresponding to an obtained energy replenishment demand information according to the energy replenishment demand information, the selected energy replenishment resource scheduling policy, and the latest working states of the energy replenishment resources obtained from the resource management center.

Solution 2. The system according to solution 1, further comprising a second terminal, wherein the cloud platform is further configured to allocate an energy replenishment resource and generate an energy replenishment order by using a valet energy replenishment request as the energy replenishment demand information, and allocate the energy replenishment order to the second terminal; and the second terminal communicates with the cloud platform through a wireless network, and is configured to obtain the allocated energy replenishment order and perform an energy replenishment action information guidance.

Solution 3. The system according to solution 2, further comprising an energy replenishment resource state acquisition device, wherein the energy replenishment resource state acquisition device communicates with the resource management center through the wireless network, and is configured to acquire energy replenishment resource state information at a set acquisition frequency, and send the energy replenishment resource state information to the resource management center.

Solution 4. The system according to solution 3, further comprising the energy replenishment resources each provided with an energy replenishment resource remote communication device, wherein the energy replenishment resource state acquisition device is installed in the energy replenishment resource; and the energy replenishment resource communicates with the cloud platform through the wireless network via the energy replenishment resource remote communication device, and is configured to receive information of the allocated order, and be set vacant in a reserved period according to the information of the order.

Solution 5. The system according to solution 4, further comprising a vehicle state acquisition device, which communicates with the resource management center through the wireless network, and is configured to acquire basic information of a vehicle and basic information of a user using the vehicle at a set acquisition frequency, and send the basic information of the vehicle and the basic information of the user using the vehicle to the resource management center.

Solution 6. The system according to solution 5, wherein the basic information of the vehicle acquired by the vehicle state acquisition device includes an available driving range of the vehicle; and the cloud platform is further configured to perform an energy replenishment judgment according to an estimated driving range of the vehicle and the available driving range of the vehicle and send an energy replenishment reminder information.

Solution 7. The system according to solution 6, wherein the basic information of the vehicle further includes a real-time location of the vehicle and the real-time remaining energy; and the basic information of the user using the vehicle includes a next possible destination, and a departure time.

Solution 8. The system according to any one of solutions 1-7, further comprising: a first terminal, wherein the first terminal communicates with the cloud platform through the wireless network, and is configured to input energy replenishment demand information and send the energy replenishment demand information to the cloud platform.

Solution 9. The system according to solution 6 or 7, further comprising: a first terminal, wherein the first terminal is configured to perform an energy replenishment reminding according to the energy replenishment reminder information sent by the cloud platform.

Solution 10. The system according to any one of solutions 1-7, further comprising: an energy replenishment demand analysis center, wherein the energy replenishment demand analysis center is configured to store user history energy replenishment behavior information, analyze and actively generate the energy replenishment demand information according to the user history energy replenishment behavior information, and the energy replenishment resource scheduling policy obtained from the scheduling policy center, and send the energy replenishment demand information to the cloud platform to allocate the corresponding energy replenishment resource.

Solution 11. The system according to any one of solutions 1-7, wherein the energy replenishment resources are power replenishment resources.

Solution 12. The system according to solution 11, wherein the power replenishment resource is a mobile charging vehicle, and/or a battery swap station, and/or a charging station, and/or a private charging pile, and/or a public charging pile.

Solution 13. The system according to any one of solutions 1-7, wherein the cloud platform is further configured to list and send feasible energy replenishment types according to the energy replenishment demand information and the usable energy replenishment resources within a set duration required in the energy replenishment demand information.

Solution 14. The system according to any one of solutions 2-7, further comprising a vehicle authorization control device provided inside the vehicle and connected to a vehicle control system, wherein the vehicle authorization control device is configured to store set vehicle authorization information and perform a corresponding vehicle action when receiving an external signal which matches the vehicle authorization information;

the cloud platform is further configured to store the vehicle authorization information, and send the corresponding vehicle authorization information to the corresponding second terminal; and the second terminal is further configured to obtain the vehicle authorization information, communicate with the vehicle authorization control device within an allowable distance, and activate the corresponding vehicle.

Solution 15. The system according to solution 14, further comprising a first terminal, wherein the first terminal is configured to set the vehicle authorization information and send the vehicle authorization information to the cloud platform and the vehicle authorization control device, respectively.

Solution 16. The system according to solution 14, wherein the cloud platform is further configured to send a vehicle search navigation scheme to the second terminal according to vehicle positioning information.

Solution 17. The system according to solution 14, wherein the second terminal is configured to: receive the energy replenishment order, and according to the energy replenishment order, perform an information guidance of searching for a vehicle to be replenished with energy, driving the vehicle to be replenished with energy to a stationary energy replenishment resource, replenishing the vehicle with energy, and returning the vehicle that has been replenished with energy to an original vehicle pick-up location.

Solution 18. The system according to solution 14, wherein the second terminal is configured to: receive the energy replenishment order, and according to the energy replenishment order, perform an information guidance of moving a non-stationary energy replenishment resource to the vicinity of a vehicle to be replenished with energy, replenishing the vehicle with energy, completing the energy replenishment the vehicle, and moving the non-stationary power replenishment resource to a specified location after completing the service.

Solution 19. The system according to solution 14, wherein the second terminal is configured to: receive the energy replenishment order, and according to the energy replenishment order, perform an information guidance of automatically driving a vehicle to be replenished with energy to a stationary or non-stationary energy replenishment resource, replenishing the vehicle with energy, and automatically driving the vehicle that has been replenished with energy to an original vehicle pick-up location.

Solution 20. The system according to solution 13, wherein the energy replenishment types are divided according to an available energy replenishment duration which is the set duration in the energy replenishment demand information.

Solution 21. The system according to solution 20, wherein the energy replenishment types are divided into a fast energy replenishment service and an economic energy replenishment service according to a set duration threshold A, wherein the available energy replenishment duration of the fast energy replenishment service is less than or equal to the set threshold A; and the available energy replenishment duration of the economic energy replenishment service is greater than the set threshold A.

Solution 22. The system according to solution 16, wherein the vehicle search navigation scheme includes GPS navigation and non-GPS navigation.

Solution 23. The system according to solution 22, wherein the non-GPS path navigation includes Wifi positioning-based or iBeacon positioning-based navigation.

Solution 24. The system according to solution 23, wherein the non-GPS path navigation includes inertial navigation, and driving route marker navigation.

Solution 25. A mobile Internet-based integrated vehicle energy replenishment system, comprising a cloud platform, a first terminal, and a second terminal, wherein the cloud platform comprises a resource management unit, an intelligent scheduling unit, and an external interface unit;

the first terminal is configured to input a valet energy replenishment request and send the valet energy replenishment request to the intelligent scheduling unit;

the external interface unit is configured to wirelessly communicate with the first terminal and the second terminal;

the resource management unit comprises an energy replenishment resource management unit configured to obtain basic information of energy replenishment resources via the external interface unit and store the basic information;

the intelligent scheduling unit comprises an energy replenishment resource scheduling unit configured to allocate an energy replenishment resource corresponding to a received valet energy replenishment request information sent by the first terminal according to the received valet energy replenishment request information and the latest working states of the energy replenishment resources stored in the energy replenishment resource management unit, generate an energy replenishment order, and send the energy replenishment order to the second terminal; and the second terminal is configured to receive the energy replenishment order generated by the energy replenishment resource scheduling unit, and generate a valet energy replenishment action guidance.

Solution 26. The system according to solution 25, further comprising the energy replenishment resources each provided with an energy replenishment resource remote communication device and an energy replenishment resource state acquisition device, wherein the energy replenishment resource state acquisition device is configured to acquire energy replenishment resource state information at a set acquisition frequency; and the energy replenishment resource remote communication device communicates with the cloud platform through a wireless network, and is configured to send the acquired energy replenishment resource state information to the cloud platform, and further to receive information of the allocated order, and be set vacant in a reserved period according to the information of the order.

Solution 27. The system according to solution 26, wherein the energy replenishment resources comprise power replenishment resources.

Solution 28. The system according to solution 27, wherein the power replenishment resource is a mobile charging vehicle, and/or a battery swap station, and/or a charging station, and/or a private charging pile, and/or a public charging pile.

Solution 29. The system according to solution 25, further comprising an energy replenishment demand analysis unit, wherein the energy replenishment demand analysis unit is configured to store user history energy replenishment behavior information, analyze and actively generate the energy replenishment demand information according to the user history energy replenishment behavior information, and an energy replenishment resource scheduling policy obtained from a scheduling policy center, and send the energy replenishment demand information to the intelligent scheduling unit to allocate the corresponding energy replenishment resource.

Solution 30. The system according to solution 25, further comprising a vehicle state acquisition device, wherein the vehicle state acquisition device communicates with the external interface unit in the cloud platform through the wireless network, and is configured to acquire basic information of a vehicle and basic information of a user using the vehicle at a set acquisition frequency, and send the basic information of the vehicle and the basic information of the user using the vehicle to the resource management unit;

the basic information of the vehicle includes an available driving range of the vehicle, a real-time location of the vehicle and the real-time remaining energy; the basic information of the user using the vehicle includes a next possible destination, and a departure time;

the cloud platform further comprises an energy replenishment reminder analysis unit configured to calculate an estimated driving range of the vehicle and the available driving range of the vehicle according to the basic information of the vehicle and the basic information of the user using the vehicle, perform an energy replenishment judgment and generate an energy replenishment reminder information; and the first terminal is further configured to receive the energy replenishment reminder information generated by the energy replenishment reminder analysis unit, and perform an energy replenishment reminding.

Solution 31. The system according to solution 25, wherein the valet energy replenishment action guidance is:

an information guidance, performed according to the energy replenishment order, of searching for a vehicle to be replenished with energy, driving the vehicle to be replenished with energy to a stationary power replenishment resource, replenishing the vehicle with energy, and returning the vehicle that has been replenished with energy to an original vehicle pick-up location.

Solution 32. The system according to solution 25, wherein the valet energy replenishment action guidance is:

an information guidance, performed according to the energy replenishment order, of moving a non-stationary power replenishment resource to the vicinity of a vehicle to be replenished with energy, replenishing the vehicle with energy, completing the energy replenishment the vehicle, and moving the non-stationary power replenishment resource to a specified location after completing the service.

Solution 33. The system according to solution 25, wherein the valet energy replenishment action guidance is:

an information guidance, performed according to the energy replenishment order, of automatically driving a vehicle to be replenished with energy to a stationary and/or non-stationary power replenishment resource, replenishing the vehicle with energy, and automatically driving the vehicle that has been replenished with energy to an original vehicle pick-up location.

Solution 34. A mobile Internet-based integrated vehicle energy replenishment system, comprising a resource management unit, and an intelligent scheduling unit, wherein the resource management unit comprises an energy replenishment resource management unit configured to obtain and store basic information of energy replenishment resources; and the intelligent scheduling unit comprises an energy replenishment resource scheduling unit configured to allocate an energy replenishment resource corresponding to a received energy replenishment demand information according to the received energy replenishment demand information and the latest working states of the energy replenishment resources stored in the energy replenishment resource management unit.

Solution 35. The system according to solution 34, wherein the intelligent scheduling unit further comprises an energy replenishment reminder analysis unit, wherein the energy replenishment reminder analysis unit is configured to perform an energy replenishment judgment according to an estimated driving range of the vehicle and the available driving range of the vehicle, and send an energy replenishment reminder information.

Solution 36. The system according to solution 35, wherein the energy replenishment reminder analysis unit is further configured to send an energy replenishment scheme generated according to the energy replenishment reminder information while sending an energy replenishment reminder, wherein the method for generating the energy replenishment scheme is using the energy replenishment reminder information as the energy replenishment demand information and allocating the energy replenishment resource by the energy replenishment resource scheduling unit.

Solution 37. The system according to solution 36, wherein the estimated driving range of the vehicle is determined according to a driving destination of the vehicle, or according to customary driving routes derived from the statistical analysis of historical data, or according to a driving range within a set period of time that is derived from the statistical analysis of the historical data.

Solution 38. The system according to solution 37, wherein the intelligent scheduling unit further comprises an energy replenishment type recommendation unit, wherein the energy replenishment type recommendation unit is configured to list and send feasible energy replenishment types according to the energy replenishment demand information and the usable energy replenishment resources within a set duration required in the energy replenishment demand information.

Solution 39. The system according to solution 38, wherein the energy replenishment types are divided according to an available energy replenishment duration which is the set duration in the energy replenishment demand information.

Solution 40. The system according to solution 39, wherein the energy replenishment types are divided into a fast energy replenishment service and an economic energy replenishment service according to a set duration threshold A, wherein the available energy replenishment duration of the fast energy replenishment service is less than or equal to the set threshold A; and the available energy replenishment duration of the economic energy replenishment service is greater than the set threshold A.

Solution 41. The system according to solution 34, wherein the allocation of the energy replenishment resource corresponding to the energy replenishment demand information in the energy replenishment resource scheduling unit comprises:

the energy replenishment resource is allocated by the energy replenishment resource scheduling unit according to the energy replenishment demand information; and if the allocated energy replenishment resource is abnormal and cannot provide the reserved energy replenishment service, reallocation is performed by the energy replenishment resource scheduling unit according to the initial energy replenishment demand information, and the allocated energy replenishment resource is updated.

Solution 42. The system according to solution 34, wherein the energy replenishment resource scheduling unit is further configured to actively schedule the energy replenishment resources according to historical usage data of the energy replenishment resources with the aim of maximizing the utilization efficiency of the energy replenishment resources within a specific area.

Solution 43. The system according to any one of solutions 34-42, further comprising: a first terminal, wherein the first terminal is further configured to input an energy replenishment demand information and send the energy replenishment demand information to the intelligent scheduling unit.

Solution 44. The system according to any one of solutions 35-40, further comprising: a first terminal, wherein the first terminal comprises an energy replenishment reminding unit, wherein the energy replenishment reminding unit is configured to perform an energy replenishment reminding according to the energy replenishment reminder information sent by the energy replenishment reminder analysis unit.

Solution 45. The system according to any one of solutions 34-42, wherein the intelligent scheduling unit further comprises an energy replenishment demand analysis unit, wherein the energy replenishment demand analysis unit is configured to analyze and actively generate the energy replenishment demand information according to user history energy replenishment behavior information and a set energy replenishment resource scheduling policy, and send the energy replenishment demand information to the energy replenishment resource scheduling unit to allocate the corresponding energy replenishment resource.

Solution 46. The system according to any one of solutions 34-42, wherein the energy replenishment resources are power replenishment resources.

Solution 47. The system according to solution 46, wherein the power replenishment resource is a mobile charging vehicle, and/or a battery swap station, and/or a charging station, and/or a private charging pile, and/or a public charging pile.

Solution 48. The system according to solution 46, wherein the energy replenishment resource management unit is further configured to obtain and store service capability prediction information of the energy replenishment resources; and the information according to which the energy replenishment resource corresponding to the energy replenishment demand information is allocated in the energy replenishment resource scheduling unit further comprises: the obtained service capability prediction information of the energy replenishment resources.

Solution 49. The system according to solution 46, wherein the energy replenishment resource scheduling unit is further configured to configure the energy replenishment resource types according to a corresponding area classification.

Solution 50. The system according to solution 49, wherein the area classification includes a large-capacity user area, a medium-capacity user area, a small-capacity user area, a tidal user area, and an area where users are widely distributed but scattered.

Solution 51. The system according to solution 50, wherein the energy replenishment resource types include stationary power replenishment resources, and non-stationary power replenishment resources.

Solution 52. The system according to solution 51, wherein the stationary power replenishment resources are divided into a large-capacity service capability, a medium-capacity service capability, a small-capacity service capability, and a minute-capacity service capability according to a service capability based on a pre-set parameter.

Solution 53. The system according to solution 52, wherein the non-stationary power replenishment resources are divided into a medium-capacity service capability, and a small-capacity service capability according to the service capability based on the pre-set parameter.

Solution 54. The system according to solution 53, wherein the method for configuring the energy replenishment resource type is: providing a combination of stationary power replenishment resources and non-stationary power replenishment resources of different service capabilities according to the number and time distribution characteristics of energy replenishment demands of a serviced area.

Solution 55. The system according to solution 54, wherein the configuration of the energy replenishment resource type comprises:

for the large-capacity user area, the power replenishment resources configured for the power replenishment service include large-capacity service capability stationary power replenishment resources;

for the medium-capacity user area, the power replenishment resources configured for the power replenishment service include medium-capacity service capability stationary power replenishment resources;

for the small-capacity user area, the power replenishment resources configured for the power replenishment service include small-capacity service capability stationary power replenishment resources;

for the tidal user area, the selection of the stationary power replenishment resource classification is determined according to the basic number of user demands in this area, and the power replenishment resources selected for the power replenishment service in the area are mainly configured as the power replenishment resources in this classification; and for the area where the users are widely distributed but scattered, the power replenishment resources configured for the power replenishment service include one or not less than one types of non-stationary power replenishment resources.

Solution 56. The system according to any one of solutions 34-42, further comprising: a second terminal, wherein the intelligent scheduling unit further comprises an order generation unit;

the order generation unit is configured to allocate the energy replenishment resource by the intelligent scheduling unit, and generate an energy replenishment order by using a valet energy replenishment request as the energy replenishment demand information; and the second terminal is configured to obtain the allocated energy replenishment order and perform an energy replenishment action information guidance.

Solution 57. The system according to solution 56, further comprising a first terminal, wherein the first terminal comprises a valet energy replenishment requesting unit, wherein the valet energy replenishment requesting unit is configured to send valet energy replenishment request information.

Solution 58. The system according to solution 56, wherein the second terminal is configured to: receive the energy replenishment order, and according to the energy replenishment order, perform an information guidance of searching for a vehicle to be replenished with energy, driving the vehicle to be replenished with energy to a stationary power replenishment resource, replenishing the vehicle with energy, and returning the vehicle that has been replenished with energy to an original vehicle pick-up location.

Solution 59. The system according to solution 56, wherein the second terminal is configured to: receive the energy replenishment order, and according to the energy replenishment order, perform an information guidance of moving a non-stationary power replenishment resource to the vicinity of a vehicle to be replenished with energy, replenishing the vehicle with energy, completing the energy replenishment the vehicle, and moving the non-stationary power replenishment resource to a specified location after completing the service.

Solution 60. The system according to solution 56, wherein the second terminal is configured to: receive the energy replenishment order, and according to the energy replenishment order, perform an information guidance of automatically driving a vehicle to be replenished with energy to a stationary and/or non-stationary power replenishment resource, replenishing the vehicle with energy, and automatically driving the vehicle that has been replenished with energy to an original vehicle pick-up location.

Solution 61. The system according to solution 56, wherein the intelligent scheduling unit further comprises a parking spot navigation unit configured to send a vehicle search navigation scheme to the second terminal according to vehicle positioning information.

Solution 62. The system according to solution 61, wherein the vehicle search navigation scheme includes GPS navigation and non-GPS navigation.

Solution 63. The system according to solution 62, wherein the non-GPS path navigation includes Wifi positioning-based or iBeacon positioning-based navigation.

Solution 64. The system according to solution 62, wherein the non-GPS path navigation includes inertial navigation, and driving route marker navigation.

Solution 65. The system according to solution 56, further comprising a vehicle keyless authorization system, wherein the vehicle keyless authorization system is configured to operate the vehicle within an authorized range according to an authorized control instruction when the second terminal is within a set distance of the corresponding vehicle.

Solution 66. The system according to solution 65, wherein the vehicle keyless authorization system comprises a vehicle authorization control module, an automatic authorization unit, and an authorization activation unit, wherein the vehicle authorization control module is provided inside the vehicle; the automatic authorization unit is provided in the intelligent scheduling unit; the authorization activation unit is provided in the second terminal;

the vehicle authorization control module is configured to store set vehicle authorization information and perform a corresponding vehicle action when receiving an external signal which matches the vehicle authorization information;

the automatic authorization unit is configured to store the vehicle authorization information, and send the corresponding vehicle authorization information to the corresponding second terminal; and the authorization activation unit is configured to obtain and store corresponding vehicle authorization information, and when within the set distance of the corresponding vehicle, send the vehicle authorization information to the vehicle authorization control module of the corresponding vehicle.

Solution 67. The system according to solution 66, further comprising a first terminal, wherein the first terminal comprises a vehicle authorization setting unit, wherein the vehicle authorization setting unit is configured to set vehicle authorization information, and send the vehicle authorization information to the vehicle authorization control system and the automatic authorization unit respectively for storage purpose.

Solution 68. The system according to solution 57, wherein the first terminal further comprises an order status displaying unit configured to obtain and display status information of the energy replenishment order of the corresponding vehicle.

Solution 69. The system according to any one of solutions 34-42, wherein the resource management unit further comprises a vehicle management unit configured to obtain and store basic information of the vehicle and basic information of a user using the vehicle for the intelligent scheduling unit to retrieve.

Solution 70. The system according to solution 69, wherein the basic information of the vehicle includes a real-time location of the vehicle, the real-time remaining energy, and an available cruising range; and the basic information of the user using the vehicle includes a next possible destination, and a departure time.

Solution 71. The system according to solution 48, wherein the basic information of the energy replenishment resources includes a real-time location, working state information, and technical parameters when in a working state and out of the working state; and the energy replenishment resource service capability prediction information is power replenishment resource service capability prediction information, including reserved information.

Solution 72. The system according to solution 71, wherein the technical parameters when in the working state and out of the working state of the basic information of the energy replenishment resources include an input and/or output voltage, an input and/or output current, and an input and/or output power.

Solution 73. A mobile Internet-based integrated vehicle energy replenishment method, comprising:

obtaining and updating basic information of energy replenishment resources;

obtaining valet energy replenishment request information;

allocating an energy replenishment resource corresponding to the valet energy replenishment request information according to the obtained valet energy replenishment request information and the latest working states of the energy replenishment resources in the basic information of the energy replenishment resources, generating an energy replenishment order, and sending the energy replenishment order to the second terminal; and the second terminal generating a valet energy replenishment action guidance according to the received energy replenishment order.

Solution 74. The method according to solution 73, wherein the valet energy replenishment request information is inputted from a first terminal, or is actively generated through an energy replenishment demand analysis, wherein the energy replenishment demand analysis comprises: analyzing and actively generating energy replenishment demand information according to user history energy replenishment behavior information and a set energy replenishment resource scheduling policy, and using the generated energy replenishment demand information to as the valet energy replenishment request information.

Solution 75. The method according to solution 73, further comprising energy replenishment reminding, comprising the following steps:

acquiring basic information of a vehicle and basic information of a user using the vehicle at a set acquisition frequency, wherein the basic information of the vehicle includes an available driving range of the vehicle, a real-time location of the vehicle and the real-time remaining energy, and the basic information of the user using the vehicle includes a next possible destination, and a departure time;

calculating an estimated driving range of the vehicle and the available driving range of the vehicle according to the basic information of the vehicle and the basic information of the user using the vehicle, performing an energy replenishment judgment, and generating an energy replenishment reminder information when the difference between the available driving range of the vehicle and the estimated driving range of the vehicle is less than a set threshold; and sending energy replenishment reminder information to the first terminal for performing the energy replenishment reminding.

Solution 76. The method according to solution 73, wherein the valet energy replenishment action guidance is:

an information guidance, performed according to the energy replenishment order, of searching for a vehicle to be replenished with energy, driving the vehicle to be replenished with energy to a stationary power replenishment resource, replenishing the vehicle with energy, and returning the vehicle that has been replenished with energy to an original vehicle pick-up location.

Solution 77. The method according to solution 73, wherein the valet energy replenishment action guidance is:

an information guidance, performed according to the energy replenishment order, of moving a non-stationary power replenishment resource to the vicinity of a vehicle to be replenished with energy, replenishing the vehicle with energy, completing the energy replenishment the vehicle, and moving the non-stationary power replenishment resource to a specified location after completing the service.

Solution 78. The method according to solution 73, wherein the valet energy replenishment action guidance is:

an information guidance, performed according to the energy replenishment order, of automatically driving a vehicle to be replenished with energy to a stationary and/or non-stationary power replenishment resource, replenishing the vehicle with energy, and automatically driving the vehicle that has been replenished with energy to an original vehicle pick-up location.

Solution 79. A mobile Internet-based integrated vehicle energy replenishment method, comprising:

resource management: obtaining and storing basic information of energy replenishment resources; and energy replenishment resource scheduling: allocating an energy replenishment resource corresponding to the energy replenishment demand information according to the obtained energy replenishment demand information and the latest working states of the energy replenishment resources in the basic information of the energy replenishment resources.

Solution 80. The method according to solution 79, wherein the energy replenishment demand information is inputted by a remote terminal device, or is actively generated through an energy replenishment demand analysis, wherein the energy replenishment demand analysis comprises: analyzing and actively generating the energy replenishment demand information according to user history energy replenishment behavior information and a set energy replenishment resource scheduling policy.

Solution 81. The method according to solution 80, further comprising energy replenishment reminder analysis and energy replenishment reminding, wherein the energy replenishment reminder analysis comprises: performing an energy replenishment judgment according to an estimated driving range of the vehicle and the available driving range of the vehicle, and sending an energy replenishment reminder information; and the energy replenishment reminding comprises: performing an energy replenishment reminding according to the energy replenishment reminder information sent by the energy replenishment reminder analysis unit.

Solution 82. The method according to solution 81, wherein the energy replenishment reminder analysis further comprises: sending an energy replenishment scheme generated according to the energy replenishment reminder information while sending an energy replenishment reminder, wherein the method for generating the energy replenishment scheme is using the energy replenishment reminder information as the energy replenishment demand information and allocating the energy replenishment resource by the energy replenishment resource scheduling unit.

Solution 83. The method according to solution 82, wherein the estimated driving range of the vehicle is determined according to a driving destination of the vehicle, or according to customary driving routes derived from the statistical analysis of historical data, or according to a driving range within a set period of time that is derived from the statistical analysis of the historical data.

Solution 84. The method according to solution 83, further comprising energy replenishment type recommendation:

listing feasible energy replenishment types according to the energy replenishment demand information and the usable energy replenishment resources within a set duration required in the energy replenishment demand information, and sending the feasible energy replenishment types to a human-machine interaction interface of a first terminal.

Solution 85. The method according to solution 84, wherein the energy replenishment types are divided according to an available energy replenishment duration which is the set duration in the energy replenishment demand information.

Solution 86. The method according to solution 85, wherein the energy replenishment types are divided into a fast energy replenishment service and an economic energy replenishment service according to a set duration threshold A, wherein the available energy replenishment duration of the fast energy replenishment service is less than or equal to the set threshold A; and the available energy replenishment duration of the economic energy replenishment service is greater than the set threshold A.

Solution 87. The method according to solution 79, wherein the allocation of the energy replenishment resource corresponding to the energy replenishment demand information comprises:

the energy replenishment resource is selected and allocated according to the energy replenishment demand information; and if the allocated energy replenishment resource is abnormal and cannot provide the reserved energy replenishment service, reallocation is performed on the energy replenishment resources according to the initial energy replenishment demand information, and the allocated energy replenishment resource is updated.

Solution 88. The method according to solution 79, wherein the energy replenishment resource scheduling further comprises: actively scheduling the energy replenishment resources according to historical usage data of the energy replenishment resources with the aim of maximizing the utilization efficiency of the energy replenishment resources within a specific area.

Solution 89. The method according to any one of solutions 79-88, wherein the energy replenishment resources are power replenishment resources.

Solution 90. The method according to solution 89, wherein the power replenishment resource is a mobile charging vehicle, and/or a battery swap station, and/or a charging station, and/or a private charging pile, and/or a public charging pile.

Solution 91. The method according to solution 90, wherein service capability prediction information of the energy replenishment resources is further obtained and stored after the basic information of the energy replenishment resources is obtained; and the information according to which the energy replenishment resource corresponding to the energy replenishment demand information is allocated comprises: the obtained service capability prediction information of the energy replenishment resources.

Solution 92. The method according to solution 90, wherein the energy replenishment resource scheduling further comprises configuring the energy replenishment resource types according to a corresponding area classification.

Solution 93. The method according to solution 92, wherein the area classification includes a large-capacity user area, a medium-capacity user area, a small-capacity user area, a tidal user area, and an area where users are widely distributed but scattered.

Solution 94. The method according to solution 93, wherein the energy replenishment resource types include stationary power replenishment resources, and non-stationary power replenishment resources.

Solution 95. The method according to solution 94, wherein the stationary power replenishment resources are divided into a large-capacity service capability, a medium-capacity service capability, a small-capacity service capability, and a minute-capacity service capability according to a service capability based on a pre-set parameter.

Solution 96. The method according to solution 95, wherein the non-stationary power replenishment resources are divided into a medium-capacity service capability, and a small-capacity service capability according to the service capability based on the pre-set parameter.

Solution 97. The method according to solution 96, wherein the method for configuring the energy replenishment resource type is: providing a combination of stationary power replenishment resources and non-stationary power replenishment resources of different service capabilities according to the number and time distribution characteristics of energy replenishment demands of a serviced area.

Solution 98. The method according to solution 97, wherein the configuration of the energy replenishment resource type comprises:

for the large-capacity user area, the power replenishment resources configured for the power replenishment service include large-capacity service capability stationary power replenishment resources;

for the medium-capacity user area, the power replenishment resources configured for the power replenishment service include medium-capacity service capability stationary power replenishment resources;

for the small-capacity user area, the power replenishment resources configured for the power replenishment service include small-capacity service capability stationary power replenishment resources;

for the tidal user area, the selection of the stationary power replenishment resource classification is determined according to the basic number of user demands in this area, and the power replenishment resources selected for the power replenishment service in the area are mainly configured as the power replenishment resources in this classification; and for the area where the users are widely distributed but scattered, the power replenishment resources configured for the power replenishment service include one or not less than one types of non-stationary power replenishment resources.

Solution 99. The method according to any one of solutions 79-88, further comprising allocating the energy replenishment resource and generating an energy replenishment order by using a valet energy replenishment request as the energy replenishment demand information, and sending the energy replenishment order to a second terminal for an action guidance.

Solution 100. The method according to solution 99, wherein the energy replenishment order is received at the second terminal, and according to the energy replenishment order, an information guidance is performed of searching for a vehicle to be replenished with energy, driving the vehicle to be replenished with energy to a stationary power replenishment resource, replenishing the vehicle with energy, and returning the vehicle that has been replenished with energy to an original vehicle pick-up location.

Solution 101. The method according to solution 99, wherein the energy replenishment order is received at the second terminal, and according to the energy replenishment order, an information guidance is performed of moving a non-stationary power replenishment resource to the vicinity of a vehicle to be replenished with energy, replenishing the vehicle with energy, completing the energy replenishment the vehicle, and moving the non-stationary power replenishment resource to a specified location after completing the service.

Solution 102. The method according to solution 99, wherein the energy replenishment order is received at the second terminal, and according to the energy replenishment order, an information guidance is performed of automatically driving a vehicle to be replenished with energy to a stationary and/or non-stationary power replenishment resource, replenishing the vehicle with energy, and automatically driving the vehicle that has been replenished with energy to an original vehicle pick-up location.

Solution 103. The method according to solution 99, wherein the intelligent scheduling further comprises sending a vehicle search navigation scheme to the second terminal according to vehicle positioning information.

Solution 104. The method according to solution 103, wherein the vehicle search navigation scheme includes GPS navigation and non-GPS navigation.

Solution 105. The method according to solution 104, wherein the non-GPS path navigation includes Wifi positioning-based or iBeacon positioning-based navigation.

Solution 106. The method according to solution 104, wherein the non-GPS path navigation includes inertial navigation, and driving route marker navigation.

Solution 107. The method according to solution 99, further comprising vehicle keyless authorization, wherein the method for the vehicle keyless authorization system is: operating the vehicle within an authorized range according to an authorized control instruction when the second terminal is within a set distance of the corresponding vehicle.

Solution 108. The method according to solution 99, further comprising the first terminal obtaining and displaying status information of the energy replenishment order of the corresponding vehicle.

Solution 109. The method according to any one of solutions 79-88, wherein the resource management further comprises vehicle management, which involves acquiring basic information of the vehicle and basic information of a user using the vehicle for the intelligent scheduling unit to retrieve.

Solution 110. The method according to solution 109, wherein the basic information of the vehicle includes a real-time location of the vehicle, the real-time remaining energy, and an available cruising range; and the basic information of the user using the vehicle includes a next possible destination, and a departure time.

Solution 111. The method according to solution 91, wherein the basic information of the energy replenishment resources includes a real-time location, working state information, and technical parameters when in a working state and out of the working state; and the energy replenishment resource service capability prediction information is power replenishment resource service capability prediction information, including reserved information.

Solution 112. The method according to solution 111, wherein the technical parameters when in the working state and out of the working state of the basic information of the energy replenishment resources include an input and/or output voltage, an input and/or output current, and an input and/or output power.

Solution 113. A storage medium in which a plurality of programs are stored, wherein the programs are adapted to be loaded by a processor and to implement the content of a mobile Internet-based integrated vehicle energy replenishment method of solutions 73-78.

Solution 114. A storage medium in which a plurality of programs are stored, wherein the programs are adapted to be loaded by a processor and to implement the content of a mobile Internet-based integrated vehicle energy replenishment method of solutions 79-98.

Solution 115. The storage medium according to solution 114, wherein the programs stored in the storage medium are further adapted to be loaded by the processor and to:

allocate the energy replenishment resource and generate an energy replenishment order by using a valet energy replenishment request as the energy replenishment demand information, and send the energy replenishment order to a second terminal.

Solution 116. The storage medium according to solution 115, wherein the second terminal stores a plurality of programs adapted to be loaded by a processor and to:

receive the energy replenishment order, and according to the energy replenishment order, perform an information guidance of searching for a vehicle to be replenished with energy, driving the vehicle to be replenished with energy to a stationary power replenishment resource, replenishing the vehicle with energy, and returning the vehicle that has been replenished with energy to an original vehicle pick-up location.

Solution 117. The storage medium according to solution 115, wherein the second terminal stores a plurality of programs adapted to be loaded by a processor and to:

receive the energy replenishment order, and according to the energy replenishment order, perform an information guidance of moving a non-stationary power replenishment resource to the vicinity of a vehicle to be replenished with energy, replenishing the vehicle with energy, completing the energy replenishment the vehicle, and moving the non-stationary power replenishment resource to a specified location after completing the service.

Solution 118. The storage medium according to solution 115, wherein the second terminal stores a plurality of programs adapted to be loaded by a processor and to:

receive the energy replenishment order, and according to the energy replenishment order, perform an information guidance of automatically driving a vehicle to be replenished with energy to a stationary and/or non-stationary power replenishment resource, replenishing the vehicle with energy, and automatically driving the vehicle that has been replenished with energy to an original vehicle pick-up location.

Solution 119. The storage medium according to solution 114, wherein the programs stored in the storage medium are further adapted to be loaded by the processor and to:

receive an energy replenishment request sent by a first terminal

Solution 120. The storage medium according to solution 119, wherein the first terminal stores a plurality of programs adapted to be loaded by a processor and to:

perform an energy replenishment reminding according to received energy replenishment reminder information.

Solution 121. A mobile Internet-based integrated vehicle energy replenishment system, which comprises a processor adapted to execute various programs; and a storage apparatus adapted to store a plurality of programs, wherein the programs are adapted to be loaded by the processor and to implement:

the content of a mobile Internet-based integrated vehicle energy replenishment method of solutions 73-78.

Solution 122. A mobile Internet-based integrated vehicle energy replenishment system, which comprises a processor adapted to execute various programs; and a storage apparatus adapted to store a plurality of programs, wherein the programs are adapted to be loaded by the processor and to implement:

the content of a mobile Internet-based integrated vehicle energy replenishment method of solutions 79-98.

Solution 123. The energy replenishment system according to solution 122, wherein the programs stored in the storage apparatus are further adapted to be loaded by the processor and to:

allocate the energy replenishment resource and generate an energy replenishment order by using a valet energy replenishment request as the energy replenishment demand information, and send the energy replenishment order to a second terminal.

Solution 124. The energy replenishment system according to solution 123, wherein the second terminal stores a plurality of programs adapted to be loaded by a processor and to:

receive the energy replenishment order, and according to the energy replenishment order, perform an information guidance of searching for a vehicle to be replenished with energy, driving the vehicle to be replenished with energy to a stationary power replenishment resource, replenishing the vehicle with energy, and returning the vehicle that has been replenished with energy to an original vehicle pick-up location.

Solution 125. The energy replenishment system according to solution 123, wherein the second terminal stores a plurality of programs adapted to be loaded by a processor and to:

receive the energy replenishment order, and according to the energy replenishment order, perform an information guidance of moving a non-stationary power replenishment resource to the vicinity of a vehicle to be replenished with energy, replenishing the vehicle with energy, completing the energy replenishment the vehicle, and moving the non-stationary power replenishment resource to a specified location after completing the service.

Solution 126. The energy replenishment system according to solution 123, wherein the second terminal stores a plurality of programs adapted to be loaded by a processor and to:

receive the energy replenishment order, and according to the energy replenishment order, perform an information guidance of automatically driving a vehicle to be replenished with energy to a stationary and/or non-stationary power replenishment resource, replenishing the vehicle with energy, and automatically driving the vehicle that has been replenished with energy to an original vehicle pick-up location.

Solution 127. The energy replenishment system according to solution 122, wherein the programs stored in the storage apparatus are further adapted to be loaded by the processor and to:

receive an energy replenishment request sent by a first terminal

Solution 128. The energy replenishment system according to solution 127, wherein the first terminal stores a plurality of programs adapted to be loaded by a processor and to:

perform an energy replenishment reminding according to received energy replenishment reminder information.

The invention implements a convenient power replenishment guidance by means of the first terminal, the resource management unit, and the intelligent scheduling unit in the mobile Internet-based integrated vehicle energy replenishment system. The dynamic energy replenishment reminding can be more intelligently performed according to the usage condition of the user by means of the energy replenishment reminding unit. The energy replenishment type recommendation unit can flexibly configure multiple types of energy replenishment schemes according to the acceptable service duration information set in a customer order, so that different charging standards are provided while increasing the flexibility of the energy replenishment schemes, and it is possible to indirectly adjust the uniform distribution of the energy replenishment demands. A second terminal is additionally provided on the basis of the above technical solutions, the first terminal is additionally provided with a valet energy replenishment requesting unit, and the intelligent scheduling unit is additionally provided with an order generation unit, so that the function of valet energy replenishment is realized, further increasing the convenience in vehicle energy replenishment. A parking spot navigation unit is provided, and the navigation settings in outdoor and indoor situations are fully considered, so that it is convenient for the valet energy replenishment service personnel to quickly find the vehicle to be replenished with energy. A vehicle authorization control module is provided, in combination with the relevant settings of the vehicle, the first terminal and the second terminal, it is more convenient for the handover of the vehicle between the valet energy replenishment service personnel and the user.

According to the invention, the energy replenishment demands of the customers can be more effectively discovered, and thus service personnels and energy replenishment resources are scheduled much effectively; and convenient and rapid energy replenishment of the vehicles is achieved.

DETAILED DESCRIPTION OF EMBODIMENTS

Figure 1:
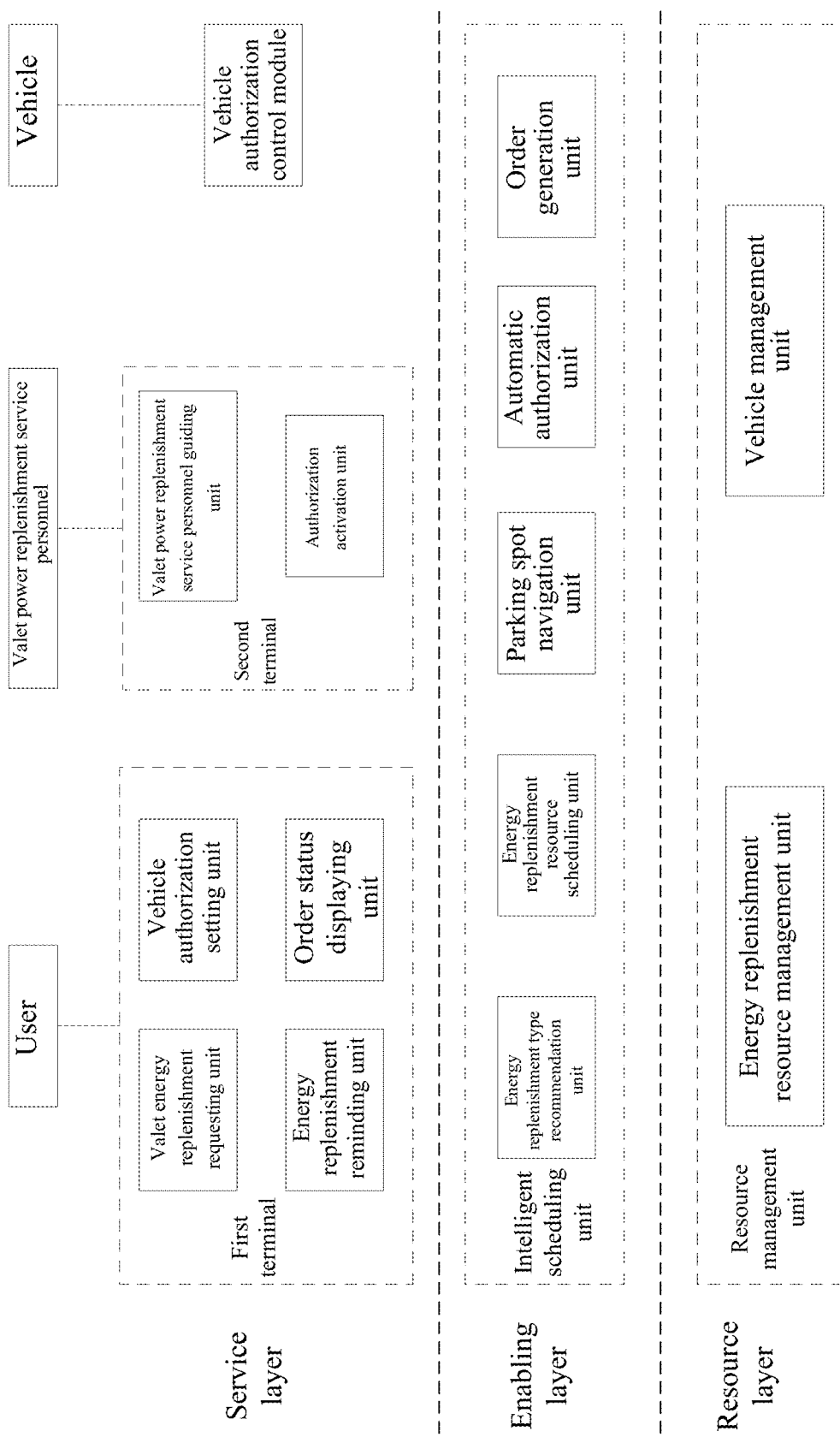
FIG. 1 is a schematic block diagram showing the structure of a mobile Internet-based integrated vehicle energy replenishment system of an embodiment of the invention.

Preferred embodiments of the invention are described below with reference to the accompanying drawings. It should be understood by those skilled in the art that these embodiments are only for explaining the technical principles of the invention and are not intended to limit the scope of protection of the invention.

An object of the invention is to construct an integrated vehicle energy replenishment system and fully integrate Internet technology to design the system. Although the invention is proposed for the technical problem in the field of electric vehicle power replenishment, it can be equally applied to other similar fields, such as vehicle refueling, vehicle gas replenishment, and can be also applied to other products having power replenishment demands, such as electric motorcycles, electric bicycles, etc.

The design of the basic functions of the invention includes a resource management unit and an intelligent scheduling unit; but in order to better realize the convenience brought about by the system, the following content can be gradually added on this basis:

(1) a method for obtaining the energy replenishment demand is added, wherein firstly, the energy replenishment demand may be obtained by additionally providing a first terminal for inputting the energy replenishment demand, and secondly, the energy replenishment demand may be actively obtained by additionally providing an energy replenishment demand analysis unit to analyze historical behavior data of a user;

(2) the intelligent scheduling unit is additionally provided with an energy replenishment reminder analysis unit, and the first terminal is additionally provided with an energy replenishment reminding unit;

(3) the intelligent scheduling unit is additionally provided with an energy replenishment type recommendation unit;

(4) an energy replenishment resource scheduling unit is additionally provided with an active scheduling function;

(5) a second terminal is additionally provided, the first terminal is additionally provided with a valet energy replenishment requesting unit, and the intelligent scheduling unit is additionally provided with an order generation unit;

(6) the intelligent scheduling unit is additionally provided with a parking spot navigation unit;

(7) a vehicle authorization control module is additionally provided, the intelligent scheduling unit is additionally provided with an automatic authorization unit, the first terminal is additionally provided with a vehicle authorization setting unit, and the second terminal is additionally provided with an authorization activation unit;

(8) a vehicle management unit is additionally provided; and (9) if energy replenishment resources are power replenishment resources, the energy replenishment resource scheduling unit is additionally provided with a function of configuring the energy replenishment resource type according to a corresponding area classification.

The specific technical solutions of the above various parts of the content are consistent with the description of the corresponding parts in the embodiments of the following preferred most functionally comprehensive technical solution.

In order to clarify the technical content of the technical solutions of the invention, a detailed description is given below in conjunction with the preferred most functionally comprehensive technical solution of the invention by using valet power replenishment as an example. The "power replenishment" described in the following embodiments is "energy replenishment", for example, "power replenishment resource" is "energy replenishment resource", and "power replenishment demand" is "energy replenishment demand".

In embodiments of the system and method of the invention, the power replenishment resource includes a combination of one or more of a mobile charging vehicle, a battery swap station, a charging station, a private charging pile, and a public charging pile, and the specific type of the power replenishment resource does not affect the implementation of the technical solutions of the invention and the realization of the technical effects.

As shown in FIG. 1, the invention comprises a three-layer structure, specifically a service layer, an enabling layer, and a resource layer (the description of layering herein is for better and clear description of the system architecture, and is not the concept of layers in the pure software development, and the "layer" herein may also be a "subsystem"), wherein the service layer comprises a first terminal, a second terminal, and a vehicle authorization control module; the enabling layer comprises an intelligent scheduling unit; and the resource layer comprises a resource management unit.

The first terminal is configured to input power replenishment demand information and send the power replenishment demand information to the intelligent scheduling unit, and obtain and display status information of a corresponding vehicle power replenishment order; and the first terminal further comprises an energy replenishment reminding unit, a valet energy replenishment requesting unit, a vehicle authorization setting unit, and an order status displaying unit.

The second terminal is configured to receive a power replenishment order, and according to the power replenishment order, perform an information guidance of searching for a vehicle to be replenished with energy, driving the vehicle to be replenished with energy to a power replenishment resource location, replenishing the vehicle with power, and returning the vehicle. The second terminal further comprises an authorization activation unit.

The vehicle authorization control module is configured to store set vehicle authorization information and perform a corresponding vehicle action when receiving an external signal which matches the vehicle authorization information.

The resource management unit comprises an energy replenishment resource management unit, and a vehicle management unit.

The intelligent scheduling unit comprises an energy replenishment resource scheduling unit, an energy replenishment type recommendation unit, a parking spot navigation unit, an automatic authorization unit, an order generation unit, an energy replenishment demand analysis unit, and an energy replenishment reminder analysis unit.

The corresponding functions of the service layer, the enabling layer, and the resource layer are set as follows:

Service Layer

The service layer is a layer that provides services to a user. It provides the user with the following services: valet power replenishment service, intelligent driving range reminding, and power replenishment scheme recommendation service.

The main factors contained in the service layer are: a valet power replenishment service personnel, a user, and a vehicle to be replenished with energy.

Enabling Layer

The enabling layer is a layer that is connected to the upper and lower layers. It manages the vehicle of the user and power replenishment resources in a unified manner by means of the vehicle management unit and the energy replenishment resource management unit in the resource layer. Here, we collect real-time information of the vehicle and the power replenishment resources, such as electrical quantity, cruising range, current geographical location and current working state (idle or busy), and report this information to the intelligent scheduling unit as an information input for the intelligent computation thereof; and at the same time, the intelligent scheduling unit implements remote control over the vehicle and the power replenishment resources, such as message pushing, command issuing and other operations. Basic services such as power replenishment request and power replenishment reminding are provided to the first terminal by means of wireless communication. At the same time, the intelligent scheduling unit of the enabling layer is provided with a series of schemes such as power replenishment type recommendation, power replenishment resource scheduling, parking spot navigation, and automatic authorization to make the valet power replenishment service obtain the best user experience.

Resource Layer

The resource layer is the base layer of the entire service, and includes two units, namely an energy replenishment resource management unit and a vehicle management unit. The vehicle management unit mainly exchanges and updates information with the vehicle, mainly acquires the basic information of the vehicles such as real-time locations, real-time electrical quantities, available cruising ranges, next possible destinations and departure times of all the serviced vehicles, and the basic information of the users using the vehicles, and transmits corresponding signals to the vehicles. The energy replenishment resource management unit mainly exchanges and updates information with usable stationary and non-stationary power replenishment resources, mainly acquires basic information of the power replenishment resources such as real-time locations, working state information (in work, ready to work, faulty, etc.), various in-work and out-of-work technical parameters (input and/or output voltage, input and/or output current, input and/or output power, etc.) and real-time service capabilities of the above two types of power replenishment resources, and power replenishment resource service capability prediction information, and transmits corresponding control instruction signals to the two types of power replenishment resources.

The energy replenishment resource management unit and the vehicle management unit further exchange and update data information with the enabling layer in real time. The vehicle management unit provides the processed basic information of the vehicle such as the real-time location, real-time electrical quantity, cruising range, next possible destination and departure time of the vehicle, and the basic information of the user using the vehicle to the service enabling layer to judge and predict a user data model, to form possible power replenishment demand information of the user. The energy replenishment resource management unit provides the processed basic information of the two types of power replenishment resources, including working parameters and working states, specifically including the basic information of the power replenishment resources such as real-time locations, working state information (in work, ready to work, faulty, etc.), various in-work and out-of-work technical parameters (input and/or output voltage, input and/or output current, input and/or output power, etc.) and real-time service capabilities, and power replenishment resource service capability prediction information to the enabling layer to judge and predict a power replenishment resource service capability model, to form possible service capability information of the power replenishment resources. The energy replenishment resource scheduling unit of the enabling layer dynamically schedules the possible power replenishment demand of the user and the possible service capability information of the power replenishment resources in real time, to meet the core user experience requirements of the user for the time-limited service in the power replenishment service.

Hereinafter, the various terminals and units in this embodiment will be described in detail.

I. First Terminal

The first terminal further comprises a valet energy replenishment requesting unit, a vehicle authorization setting unit, an order status displaying unit, and an energy replenishment reminding unit. The first terminal is a user terminal device.

1. Valet Energy Replenishment Requesting Unit

The valet energy replenishment requesting unit is configured to send valet power replenishment request information.

The valet power replenishment request information may be an unsolicited request information, or may be selected from a power replenishment scheme sent at the time of sending a power replenishment reminder, and sent the selected power replenishment scheme as a valet power replenishment request.

In the application of the invention to the electric vehicle power replenishment field, the valet power replenishment service is a service subject provided for the user by the technical solution of the invention. The key point is that the idle time (that is, the period of time in which the vehicle is not used by the user) of the vehicle is used, a valet power replenishment service personnel drives the user's vehicle to a power replenishment resource spot specified by the enabling layer to perform power replenishment, and after the power replenishment is completed, the user's vehicle will be driven back to the original place. The user can get the delivery of the service, i.e., a fully-charged vehicle by simply sending a request for 'I want a power replenishment'. The entire service process is done for the user by the valet power replenishment service personnel.

From the user's point of view, the valet power replenishment service contains the following features (a) Limited time: the entire service is completed within 1 hour (which may also be another set time);

(b) Idle time: the service is performed in the idle time of the vehicle;

(c) Transparency: the user can get the delivery of the service, i.e., a fully-charged vehicle by simply sending a request for 'I want a power replenishment'. The entire service process is done for the user by the valet power replenishment service personnel. The entire service process is transparent to the user;

(d) Open: the entire service process is open to the user. That is, the user can know the progress status of the service through various means provided by the enabling layer; and (e) Privacy Protection: the user does not have to worry about the violation of his/her privacy in the vehicle during the service. For the valet power replenishment service personnel, all privacy of the user in the vehicle is blocked.

2. Vehicle Authorization Setting Unit

The vehicle authorization setting unit is configured to set vehicle authorization information, and send the vehicle authorization information to the vehicle authorization control system and the automatic authorization unit respectively for storage purpose.

3. Order Status Displaying Unit

Order status information is obtained from the intelligent scheduling unit, and the information is displayed. This embodiment is preferably displayed in the form of a text and/or a process state diagram.

4. Energy Replenishment Reminding Unit

The energy replenishment reminding unit is configured to receive energy replenishment reminder information sent by the energy replenishment reminder analysis unit to perform an energy replenishment reminding.

II. Second Terminal

The second terminal is configured to obtain the allocated energy replenishment order and provide an energy replenishment action information guidance for the valet power replenishment service personnel, which can be implemented by providing a valet power replenishment service personnel guiding unit in this embodiment. At the same time, in order to implement the contactless vehicle handover in cooperation with the vehicle authorization control module, the second terminal includes an authorization activation unit.

The second terminal needs to upload the current state to the intelligent scheduling unit at each stage of the execution of the energy replenishment order, for enabling the intelligent scheduling unit to send the current state to the first terminal for the user to view.

The second terminal is a valet energy replenishment personnel terminal device, and may also be a valet power replenishment personnel terminal device in the field of valet power replenishment.

1. Valet Power Replenishment Service Personnel Guiding Unit

The energy replenishment action information guidance provided for the valet power replenishment service personnel includes the following three types:

(1) receiving the energy replenishment order, and according to the energy replenishment order, performing an information guidance of searching for a vehicle to be replenished with energy, driving the vehicle to be replenished with energy to a stationary power replenishment resource, replenishing the vehicle with energy, and returning the vehicle that has been replenished with energy to an original vehicle pick-up location;

(2) receiving the energy replenishment order, and according to the energy replenishment order, performing an information guidance of moving a non-stationary power replenishment resource to the vicinity of a vehicle to be replenished with energy, replenishing the vehicle with energy, completing the energy replenishment the vehicle, and moving the non-stationary power replenishment resource to a specified location after completing the service; and (3) receiving the energy replenishment order, and according to the energy replenishment order, performing an information guidance of automatically driving a vehicle to be replenished with energy to a stationary and/or non-stationary power replenishment resource, replenishing the vehicle with energy, and automatically driving the vehicle that has been replenished with energy to an original vehicle pick-up location.

The information guidance mode in this embodiment may be a map navigation mode, a voice navigation mode, or other existing navigation modes, which are existing mature technologies, and are not described herein again.

2. Authorization Activation Unit

This unit is configured to obtain and store corresponding vehicle authorization information from the automatic authorization unit, and when within a set distance of the corresponding vehicle, send the vehicle authorization information to the vehicle authorization control module of the corresponding vehicle.

In a practical application scenario, the vehicle authorization information may be sent by the second terminal after the valet power replenishment service personnel arrives at the vehicle to be replenished with energy, and the vehicle performs the corresponding action after the vehicle authorization information successfully matches the vehicle authorization information stored in the vehicle authorization control module.

III. Vehicle Authorization Control Module

The vehicle authorization control module is configured to store set vehicle authorization information and perform a corresponding vehicle action when receiving an external signal which matches the vehicle authorization information.

The vehicle authorization control module is provided inside the vehicle, is connected to the vehicle control system, and controls the vehicle so that the vehicle performs the corresponding action when a corresponding control instruction is received.

IV. Intelligent Scheduling Unit

The intelligent scheduling unit comprises an energy replenishment type recommendation unit, an energy replenishment resource scheduling unit, a parking spot navigation unit, an automatic authorization unit, an order generation unit, an energy replenishment demand analysis unit, and an energy replenishment reminder analysis unit.

The intelligent scheduling unit is further provided with an external communication interface for wirelessly communicating with the first terminal, the second terminal, and the vehicle authorization control module. If the resource management unit and the intelligent scheduling unit are separately provided, a wired network may be provided between the resource management unit and the intelligent scheduling unit to perform high-speed data exchange, and the data exchange may also be performed by means of wireless communication. If the resource management unit is integrated with the intelligent scheduling unit, communication is performed through an internal communication line.

1. Energy Replenishment Type Recommendation Unit

The energy replenishment type recommendation unit of the enabling layer intelligently recommends different power replenishment type options to the user according to the vehicle usage habit of the user and the load conditions of the power replenishment resources to meet the user's requirements for the next usage of the vehicle and use the power replenishment resources more efficiently. Different service options include a 1-hour fast power replenishment service and an economic power replenishment service where the user's requirements for the next usage of the vehicle are met but the delivery time is longer than 1 hour.

The energy replenishment type recommendation unit is configured to list feasible energy replenishment types according to the energy replenishment demand information and the usable energy replenishment resources within a set duration required in the energy replenishment demand information, and send the feasible power replenishment types to the first terminal.

The power replenishment types are divided according to the available power replenishment duration, and are divided into a fast power replenishment service and an economic power replenishment service according to a set duration threshold A, wherein the available power replenishment duration of the fast power replenishment service is less than or equal to the set threshold A, and the available power replenishment duration of the economy power replenishment service is greater than the set threshold A. The available power replenishment duration is the set duration in the power replenishment demand information sent by the first terminal. In this embodiment, the threshold A is 1 hour.

The set duration in the power replenishment demand information may be set duration information of a power replenishment demand initiated by the user, or may be a power replenishment duration which is obtained from the energy replenishment demand information analyzed and actively generated in the energy replenishment demand analysis unit based on the user history energy replenishment behavior information and matches the user's historical habits.

2. Energy Replenishment Resource Scheduling Unit

The energy replenishment resource scheduling unit allocates the most appropriate power replenishment resource to execute the corresponding power replenishment service according to the different power replenishment types (1-hour fast power replenishment service or economic power replenishment service). For the scheduling of the power replenishment resources, the power replenishment resources managed by the resource layer are used here to select the most suitable power replenishment resource type and the specific power replenishment resource spot for the power replenishment service.

For the 1-hour fast power replenishment service and the economic power replenishment service in the power replenishment request actively initiated by the user, the energy replenishment resource scheduling unit will comprehensively calculate a most appropriate power replenishment resource and service personnel according to factors such as the condition of a parking spot garage or a community of the user, the specific address location of the parking spot, the specific location of the service personnel, the idle condition of the power replenishment resources, and a single power replenishment duration, and a prediction of future service request, to perform each service while ensuring the maximum resource utilization.

During the service execution process, the energy replenishment resource scheduling unit also monitors the execution of each service in real time, and can dynamically adjust the allocation of the resources when the service execution is abnormal (the service execution delay causes the resource reservation to expire, or the allocated resources temporarily fails to provide the power replenishment service, etc.).

In addition to the passive scheduling triggered by the user request, the energy replenishment resource scheduling unit also includes active scheduling initiated by the enabling layer to maximize the system resource utilization efficiency. The active scheduling is done based on the prediction of a user behavior, that is, the prediction of a user group request, and the power replenishment resources of the resource layer are scheduled in advance before the request arrives.

Based on the above description, the energy replenishment resource scheduling unit of this embodiment may be configured as follows:

(1) to allocate a power replenishment resource corresponding to the power replenishment demand information according to the power replenishment demand information, the latest working states of the power replenishment resources stored in the energy replenishment resource management unit and a reserved state;

(2) to actively schedule the power replenishment resources according to the historical usage data of the power replenishment resources with the aim of maximizing the utilization efficiency of the power replenishment resources within a specific area; and (3) to configure a power replenishment resource type according to the corresponding area classification.

The allocation of the power replenishment resource corresponding to the power replenishment demand information in the power replenishment resource scheduling unit comprises: the power replenishment resource is allocated by the energy replenishment resource scheduling unit according to the energy replenishment demand information; and if the allocated power replenishment resource is abnormal and cannot provide the reserved power replenishment service, reallocation is performed by the power replenishment resource scheduling unit according to the initial power replenishment demand information, and the allocated power replenishment resource is updated.

The active scheduling may be: analyzing the occupation probability of each power replenishment resource in a future time according to the historical usage data of the power replenishment resources; and if the occupation probability is greater than a pre-set value, the power replenishment resource, which has a probability lower than the pre-set value and a power replenishment service time that satisfies the requirements of the power replenishment order, is preferentially selected when the reallocation of the power replenishment resources is performed.

The configuration of the power replenishment resource type according to the corresponding area classification specifically comprises:

Area classification:

the area classification includes a large-capacity user area, a medium-capacity user area, a small-capacity user area, a tidal user area, and an area where users are widely distributed but scattered;

Power replenishment resource types:

the power replenishment resource types include stationary power replenishment resources, and non-stationary power replenishment resources.

The stationary power replenishment resources are divided into a large-capacity service capability, a medium-capacity service capability, a small-capacity service capability, and a minute-capacity service capability according to the service capability. The large-capacity service capability stationary power replenishment resource mainly includes: a centralized battery swap station, a centralized energy storage and battery swap station, and a centralized photovoltaic-storage-charging integrated battery swap station. The medium-capacity service capability stationary power replenishment resource mainly includes: a distributed battery swap station, a distributed energy storage-type battery swap station, and a distributed photovoltaic-storage-charging integrated battery swap station. The small-capacity service capability stationary power replenishment resource mainly includes: a centralized charging station, a centralized energy storage and charging station, a centralized photovoltaic-storage-charging integrated charging station, and AC and DC charging piles. The minute-capacity service capability stationary power replenishment resource mainly includes: a distributed charging station, a distributed battery charging station, a distributed energy storage and charging station, and a distributed photovoltaic-storage-charging integrated charging station.

The non-stationary power replenishment resources are divided into a medium-capacity service capability, and a small-capacity service capability according to the service capability. The medium-capacity service capability non-stationary power replenishment resource includes: a centralized battery swap trolley, a battery swap trolley with a battery charging function, an energy storage-type battery swap trolley, and a photovoltaic-storage-charging integrated battery swap trolley. The small-capacity service capability non-stationary power replenishment resource includes a centralized charging vehicle, a charging vehicle with a battery charging function, an energy storage-type charging vehicle, a photovoltaic-storage-charging integrated charging vehicle, and other small-capacity non-stationary power replenishment resources.

Configuration of power replenishment resource types:

For the large-capacity user area, the power replenishment resources configured for the power replenishment service mainly include large-capacity service capability stationary power replenishment resources, such as a centralized battery swap station. A combination of one or more of the stationary and/or non-stationary power replenishment resources may be additionally selected, such as AC and DC charging piles and a battery swap trolley with a battery charging function, that is, in a certain large-capacity user service demand area, the centralized photovoltaic-storage-charging battery swap station may be mainly provided for the service. A distributed battery swap station, a battery swap trolley with a battery charging function, an energy storage-type charging vehicle and other power replenishment resources may also be included to form a combined solution to provide the user with a time-limited power replenishment service continuously and steadily.

For the medium-capacity user area, the power replenishment resources configured for the power replenishment service mainly include medium-capacity service capability stationary power replenishment resources, such as a distributed battery swap station. A combination of one or more of the other stationary and/or non-stationary power replenishment resources may be additionally selected, such as AC and DC charging piles and a battery swap trolley with a battery charging function, that is, in a certain medium-capacity user service demand area, the distributed photovoltaic-storage-charging battery swap station may be mainly provided for the service. AC and DC charging piles, a battery swap trolley with a battery charging function, an energy storage-type charging vehicle and other power replenishment resources may also be included to form a combined solution to provide the user with a time-limited power replenishment service continuously and steadily.

For the small-capacity user area, the power replenishment resources configured for the power replenishment service mainly include small-capacity service capability stationary power replenishment resources, such as a centralized charging station. A combination of one or more of the other stationary and/or the non-stationary power replenishment resources may be additionally selected, such as a distributed charging station and a battery swap trolley with a battery charging function, that is, in a certain small-capacity user service demand area, the centralized charging station may be mainly provided for the service. A distributed charging station, a battery swap trolley with a battery charging function and other power replenishment resources may also be included to form a combined solution to provide the user with a time-limited power replenishment service continuously and steadily.

For the tidal user area, the selection of the stationary power replenishment resource classification is determined according to the basic number of user demands in this area, and the power replenishment resources selected for the power replenishment service in the area are mainly configured as the power replenishment resources in this classification. A combination of one or more of the other stationary and/or non-stationary power replenishment resources may be additionally selected, such as a distributed charging station and a battery swap trolley with a battery charging function, that is, in a certain tidal user area, the distributed battery swap station may be mainly provided for the service. A centralized battery swap trolley, a battery swap trolley with a battery charging function and other power replenishment resources may also be included to form a combined solution to provide the user with a time-limited power replenishment service continuously and steadily.

For the area where the users are widely distributed but scattered, the power replenishment resources configured for the power replenishment service mainly include one or not less than one types of non-stationary power replenishment resources, such as a centralized battery swap trolley and a centralized charging vehicle, forming a separate and/or combined solution to provide the user with a time-limited power replenishment service continuously and steadily.

3. Parking Spot Navigation Unit

The parking spot navigation unit provides a quick vehicle searching scheme for the valet power replenishment service personnel, which can be combined with technical means such as vehicle ADAS function, gyroscope, license plate intelligent recognition, inertial navigation and garage POI information base, such that even in a basement without GPS signals and wireless signals, we can also accurately locate the position of the vehicle and let the valet power replenishment service personnel quickly find the vehicle of the user.

Based on the above description, the parking spot navigation unit of this embodiment may be configured to send a vehicle search navigation scheme to the second terminal according to vehicle positioning information. The vehicle search navigation scheme includes outdoor GPS navigation and indoor navigation. The indoor navigation is a vehicle search guidance in a GPS-free environment. Common indoor navigation includes inertial navigation, and driving route marker navigation.

4. Automatic Authorization Unit

The automatic authorization unit of the enable layer grants the valet power replenishment service personnel access to the vehicle of the user and the power replenishment resources. For the traditional valet energy replenishment service, the user must hand over his/her vehicle key to the service personnel in some way, which causes great inconvenience for some special situations, for example, when the user is in a meeting or not in the parking place of the vehicle. Here, a keyless authorization scheme is used, and the service personnel uses a virtual key assigned by the system to obtain access to the vehicle by means of near field communication even if the vehicle is not in the wireless network.

When the resource scheduling system allocates a valve power replenishment service personnel and a power replenishment resource, the power replenishment automatic authorization module can automatically authorize the valet power replenishment service personnel and the corresponding vehicle, and when the valet power replenishment service personnel drives the vehicle of the user to arrive at an allocated power replenishment resource spot, the power replenishment authentication can be verified and the corresponding power replenishment process can be performed.

Based on the above description, the automatic authorization unit of this embodiment may be configured to: (1) store the vehicle authorization information, and send the corresponding vehicle authorization information to the corresponding second terminal; and (2) send power replenishment authorization information and power replenishment authorization verification information to the second terminal and the corresponding power replenishment resource respectively, such that the power replenishment is performed after the second terminal reaches the power replenishment resource and the power replenishment authorization information matches the power replenishment authorization verification information.

5. Order Generation Unit

The order generation unit is configured to allocate the power replenishment resource by the intelligent scheduling unit, and generate a power replenishment order by using a valet power replenishment request as the power replenishment demand information.

6. Energy Replenishment Demand Analysis Unit

The energy replenishment demand analysis unit is configured to analyze and actively generate the energy replenishment demand information according to user history energy replenishment behavior information and a set energy replenishment resource scheduling policy, and send the energy replenishment demand information to the energy replenishment resource scheduling unit to allocate the corresponding energy replenishment resource.

In this embodiment, the user history energy replenishment behavior information may be stored in the energy replenishment demand analysis unit, or may be stored in a separately provided storage unit or database server.

In practice, on the basis that the energy replenishment analysis unit analyzes and actively generates the energy replenishment demand information, and based on the prediction of a user behavior to complete, the user group request may be predicted, such that before the request arrives, the power replenishment resources of the resource layer can be scheduled in advance; the energy replenishment demand of a single customer may also be predicted, to perform an energy replenishment information reminding or to host the energy replenishment by a valet energy replenishment personnel in the case of being authorized.

7. Energy Replenishment Reminder Analysis Unit

The energy replenishment reminder analysis unit is configured to perform a power replenishment judgment according to an estimated driving range of the vehicle and the available driving range of the vehicle, and send a power replenishment reminder; and is configured to send a power replenishment scheme generated according to the power replenishment reminder information while sending a power replenishment reminder.

An energy replenishment judgment is performed, and an energy replenishment reminder information is sent when the difference between the available driving range of the vehicle and the estimated driving range of the vehicle is less than a set threshold.

In this embodiment, the method for generating the power replenishment scheme is using the power replenishment reminder information as the power replenishment demand information and allocating the power replenishment resource by the energy replenishment resource scheduling unit.

The estimated driving range of the vehicle is determined according to a driving destination of the vehicle, or according to customary driving routes derived from the statistical analysis of historical data, or according to a driving range within a set period of time that is derived from the statistical analysis of the historical data.

The available driving range of the vehicle may be obtained through an OBD (On Board Diagnostics) interface and sent to the vehicle management unit, or may be obtained by another signal acquisition and transmission device connected to a remaining energy monitoring system of the vehicle and sent to the vehicle management unit.

The intelligent power replenishment reminding performed according to the driving range is not equivalent to the low electrical quantity reminding, but is based on a combination of factors such as the available driving range of the vehicle and the driving destination of the user (or the customary driving route of the user), such that a reminder is pushed to the user at the most appropriate time. At the same time, this reminder is tied to the corresponding power replenishment scheme. That is, when the system notifies the user that the electrical quantity is low, it also presents the power replenishment scheme. The power replenishment scheme is dynamically generated according to the specific scenario.

V. Resource Management Unit

The resource management unit comprises an energy replenishment resource management unit, and a vehicle management unit.

1. Energy Replenishment Resource Management Unit

The energy replenishment resource management unit is configured to obtain and store basic information and service capability prediction information of the power replenishment resources in a specific area. The basic information of the power replenishment resources includes a real-time location, working state information, and technical parameters when in a working state and out of the working state. The power replenishment resource service capability prediction information includes reserved information, i.e., available time period information obtained by the reserved information. The technical parameters when in the working state and out of the working state of the basic information of the power replenishment resources include an input and/or output voltage, an input and/or output current, and an input and/or output power.

2. Vehicle Management Unit

The vehicle management unit is configured to obtain and store basic information of the vehicle and basic information of a user using the vehicle for the intelligent scheduling unit to retrieve. The basic information of the vehicle includes a real-time location of the vehicle, the real-time remaining energy, and an available cruising range; and the basic information of the user using the vehicle includes a next possible destination, and a departure time. The next possible destination is obtained by analyzing the user historical behavior data.

Figure 2:
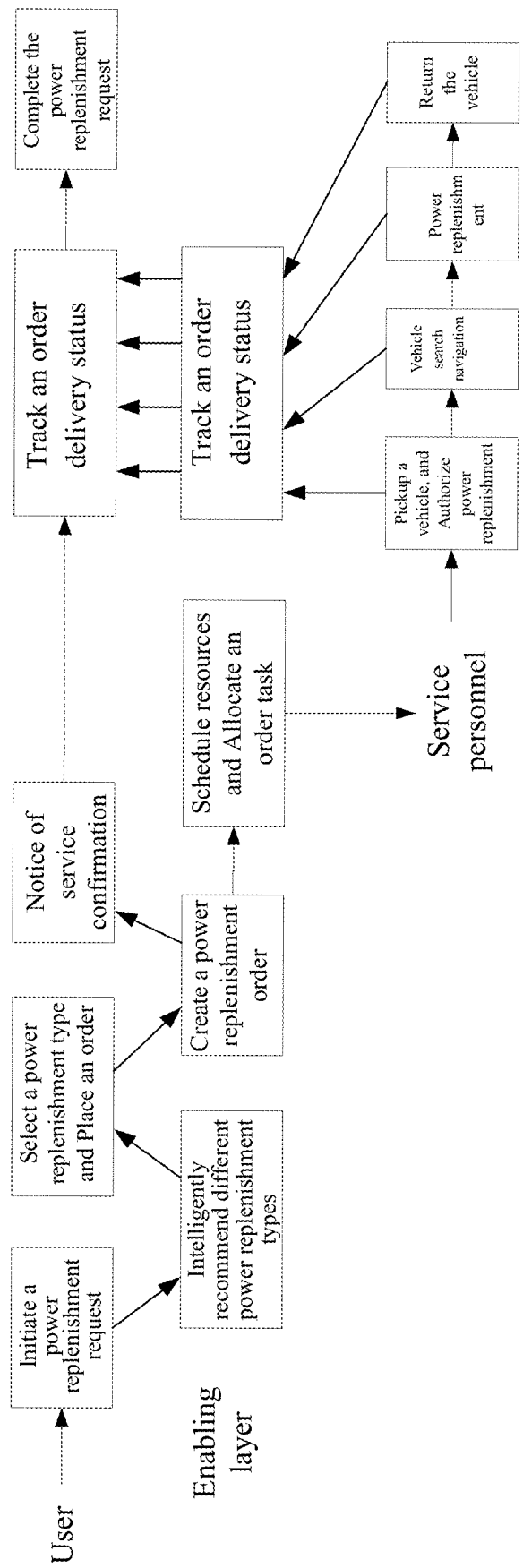
FIG. 2 is a schematic diagram of split processes of a valet power replenishment service of an embodiment of the invention.

In order to better illustrate this technical solution, as shown in FIG. 2, the process of the valet power replenishment service is split into three parts for description: a user side, an enabling layer side, and a valet power replenishment service personnel side:

User side: User Initiate a power replenishment request—Select a system-recommended power replenishment type—Confirm an order—Notice of service confirmation—Track an order delivery status—Confirm the completion of the power replenishment request;

Enabling layer side Receive user's request—Intelligently recommend different power replenishment types—Create an order based on the customer selection—Allocate a power replenishment resource and an order task based on the user order option—Automatically authorize an allocated service personnel—Track the task execution of the service personnel throughout the process and feedback the status change of the service execution.

Valet power replenishment service personnel side: Receive task and authorization information sent by an enabling layer of a cloud background system—Search for a vehicle of the user according to vehicle search navigation information—Pickup the vehicle—Drive to a power replenishment resource spot allocated by the enabling layer for power replenishment—Drive the vehicle back to the original parking spot after the power replenishment is completed.

The claimed technical solutions of the invention will be described below by various embodiments.

Figure 3:
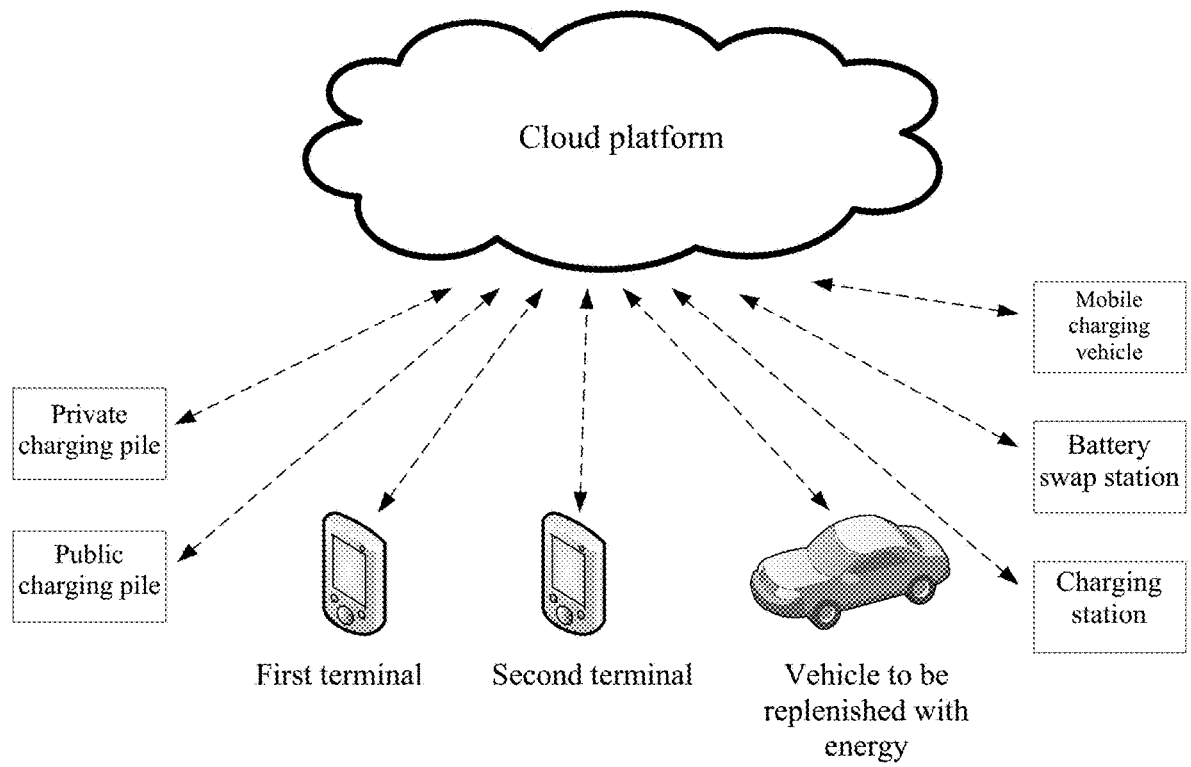
FIG. 3 is schematic block diagram showing the structure of a mobile Internet-based integrated vehicle energy replenishment system of another embodiment of the invention.
Figure 4:
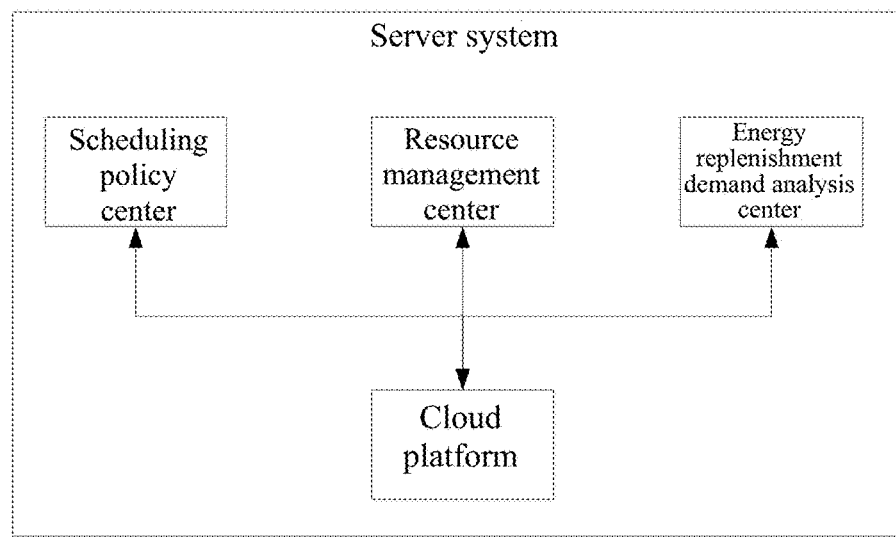
FIG. 4 is a schematic block diagram of a cloud platform server system of the mobile Internet-based integrated vehicle energy replenishment system of the embodiment of the invention.

1. In a first embodiment of the mobile Internet-based integrated vehicle energy replenishment system of the invention, as shown in FIGS. 3 and 4, a cloud platform, a scheduling policy center, and a resource management center are included. The cloud platform, the scheduling policy center, and the resource management center may be independent servers or may be integrally designed in a single server system.

In this embodiment, the scheduling policy center is connected to the cloud platform, and is configured to provide an energy replenishment resource scheduling policy to the cloud platform; the resource management center is connected to the cloud platform, and is configured to obtain and store basic information of energy replenishment resources, and provide latest working states of the energy replenishment resources to the cloud platform; and the cloud platform is configured to allocate an energy replenishment resource corresponding to an obtained energy replenishment demand information according to the energy replenishment demand information, the selected energy replenishment resource scheduling policy, and the latest working states of the energy replenishment resources obtained from the resource management center. In this way, the vehicle to be replenished with energy matches the corresponding energy replenishment resource.

In general, the energy replenishment demand is always actively initiated by the user. Therefore, the integrated vehicle energy replenishment system of this embodiment further comprises a first terminal, which communicates with the cloud platform through the wireless network, and is configured to input energy replenishment demand information and send the energy replenishment demand information to the cloud platform.

In order to enable the user to enjoy the more intelligent valet energy replenishment service, the integrated vehicle energy replenishment system of this embodiment is further provided with an energy replenishment demand analysis center, which is configured to store user history energy replenishment behavior information, analyze and actively generate the energy replenishment demand information according to the user history energy replenishment behavior information, and the energy replenishment resource scheduling policy obtained from the scheduling policy center, and send the energy replenishment demand information to the cloud platform to allocate the corresponding energy replenishment resource. The energy replenishment demand analysis center may be a server independent of the cloud platform, the scheduling policy center and the resource management center, or may be integrally designed in a single server system.

A plurality of different scheduling policies are stored in the scheduling policy center, and different scheduling policies are retrieved through the cloud platform to meet different service scenarios. For example, a fast power replenishment request initiated in an urban area may be serviced by a battery swap station; and a fast power replenishment request initiated in a suburb may be serviced by a mobile charging vehicle. Meanwhile, it is also possible to configure different scheduling targets to provide power replenishment services according to cost priority, time priority, battery life priority and other policies taking into account the characteristics of different power replenishment resources.

Only a time fastest scheduling algorithm logic is shown here to facilitate the understanding of the technical solution of the invention: when the user initiates a request, according to the geographical location requested by the user, first a list of power replenishment resources capable of completing the service is selected (for example, power replenishment resources within a circle having a radius of n km with the GPS point required by the user as the center, the value of the parameter n for the power replenishment resources of different types will be different), and the specific time to complete the service is accurately calculated for the selected power replenishment resources one by one, the one with the fastest time is then selected from the power replenishment resources to serve the user, and at the same time, the cruising range of the vehicle itself of the user, the reservation of the power replenishment resource and the queue waiting time are taken into account in the calculation, so as to ensure that the vehicle of the user can reach the power replenishment resource spot, and the resource is usable when the vehicle reaches the power replenishment resource spot.

In order to realize the requirements of the valet energy replenishment, the mobile Internet-based integrated vehicle energy replenishment system of this embodiment further comprises a second terminal. The second terminal is a device held by the valet energy replenishment service personnel. In order to implement the service of the valet energy replenishment, the technical solution of the embodiment may further comprise the following features: the first terminal is further configured to send a valet energy replenishment request information; the cloud platform is further configured to allocate an energy replenishment resource and generate an energy replenishment order by using a valet energy replenishment request as the energy replenishment demand information, and allocate the energy replenishment order to the second terminal; and the second terminal communicates with the cloud platform through a wireless network, and is configured to obtain the allocated energy replenishment order and perform an energy replenishment action information guidance.

Here, the energy replenishment action information guidance is consistent with that described in the above valet power replenishment service personnel guiding unit, and will not be described herein again.

In this embodiment, an energy replenishment resource state acquisition device is further comprised, which communicates with the resource management center through the wireless network, and is configured to acquire energy replenishment resource state information at a set acquisition frequency, and send the energy replenishment resource state information to the resource management center.

In embodiments of the invention, energy replenishment resources are further comprised, each of which is provided with an energy replenishment resource remote communication device, wherein the energy replenishment resource state acquisition device is installed in the energy replenishment resource; and the energy replenishment resource communicates with the cloud platform through the wireless network via the energy replenishment resource remote communication device, and is configured to receive information of the allocated order, and be set vacant in a reserved period according to the information of the order.

The energy replenishment resources in this embodiment are power replenishment resources, and may be a combination of one or more of a mobile charging vehicle, a battery swap station, a charging station, a private charging pile, and a public charging pile.

In embodiments of the invention, a vehicle state acquisition device is further comprised, which communicates with the resource management center through the wireless network, and is configured to acquire basic information of a vehicle and basic information of a user using the vehicle at a set acquisition frequency, and send the basic information of the vehicle and the basic information of the user using the vehicle to the resource management center. Here, the basic information of the vehicle and the basic information of the user using the vehicle are consistent with those described above, and will not be described herein again.

Further, in order to realize the intelligent energy replenishment reminding, the available driving range of the vehicle can be acquired by the vehicle state acquisition device; at this time, the cloud platform performs an energy replenishment judgment according to an estimated driving range of the vehicle and the available driving range of the vehicle, and sending an energy replenishment reminder information; and the first terminal performs an energy replenishment reminding according to the energy replenishment reminder information sent by the cloud platform.

In embodiments of the invention, the cloud platform is further configured to list feasible energy replenishment types according to the energy replenishment demand information and the usable energy replenishment resources within a set duration required in the energy replenishment demand information, and send the feasible energy replenishment types to the first terminal. Here, the setting of the energy replenishment types is consistent with that described above and will not be described herein again.

Further, the cloud platform is further configured to send a vehicle search navigation scheme to the second terminal according to vehicle positioning information. Here, the design of the vehicle search navigation scheme is consistent with that described above and will not described herein again.

Further, in this embodiment, a vehicle authorization control mode is further introduced into the system design, and the vehicle operation authorization is implemented jointly by the first terminal, the cloud platform, the second terminal, and the vehicle authorization control device which is provided inside the vehicle and connected to the vehicle control system.

The vehicle authorization control device is configured to store set vehicle authorization information and perform a corresponding vehicle action when receiving an external signal which matches the vehicle authorization information; the first terminal is configured to set the vehicle authorization information and send the vehicle authorization information to the cloud platform and the vehicle authorization control device, respectively; the cloud platform is configured to store the vehicle authorization information, and send the corresponding vehicle authorization information to the corresponding second terminal; and the second terminal is configured to obtain the vehicle authorization information, communicate with the vehicle authorization control device within an allowable distance, and activate the corresponding vehicle.

The basic information of the energy replenishment resources in this embodiment is specifically the basic information of the power replenishment resources, which includes working parameters and working states, specifically including the basic information of the power replenishment resources such as real-time locations, working state information (in work, ready to work, faulty, etc.), various in-work and out-of-work technical parameters (input and/or output voltage, input and/or output current, input and/or output power, etc.) and real-time service capabilities, and may further includes power replenishment resource service capability prediction information.

In order to avoid duplication of characters, the description of this embodiment is not fully developed, and those skilled in the pertinent technical field can clearly understand that the corresponding technical details of this embodiment can refer to the corresponding description in the foregoing energy replenishment system, and will not described herein again.

It should be noted that the mobile Internet-based integrated vehicle energy replenishment system provided in the foregoing embodiments is only illustrated by the division of the above functional parts when performing the energy replenishment service. In practical applications, the above functions are allocated to different functional modules, centers, units and devices according to requirements, that is, the functional parts in the embodiments of the invention are further decomposed or combined, for example, the functional centers (such as the scheduling policy center and the resource management center) in the foregoing embodiments may be combined into one functional center, or further split into multiple sub-centers to complete all or part of the functions described above. The names of the functional centers and devices involved in the embodiments of the invention are merely for distinguishing purpose and are not to be construed as limiting the invention.

2. The invention further provides a second embodiment of a mobile Internet-based integrated vehicle energy replenishment system, which comprises a cloud platform, a first terminal, and a second terminal, wherein the cloud platform comprises a resource management unit, an intelligent scheduling unit, and an external interface unit.

Among them:

the first terminal is configured to input a valet energy replenishment request and send the valet energy replenishment request to the intelligent scheduling unit;

the external interface unit is configured to wirelessly communicate with the first terminal and the second terminal;

the resource management unit comprises an energy replenishment resource management unit configured to obtain basic information of energy replenishment resources via the external interface unit and store the basic information;

the intelligent scheduling unit comprises an energy replenishment resource scheduling unit configured to allocate an energy replenishment resource corresponding to a received valet energy replenishment request information sent by the first terminal according to the received valet energy replenishment request information and the latest working states of the energy replenishment resources stored in the energy replenishment resource management unit, generate an energy replenishment order, and send the energy replenishment order to the second terminal; and the second terminal is configured to receive the energy replenishment order generated by the energy replenishment resource scheduling unit, and generate a valet energy replenishment action guidance.

The mobile Internet-based integrated vehicle energy replenishment system of this embodiment further comprises energy replenishment resources each provided with an energy replenishment resource remote communication device and an energy replenishment resource state acquisition device.

The energy replenishment resource state acquisition device is configured to acquire energy replenishment resource state information at a set acquisition frequency; and the energy replenishment resource remote communication device communicates with the cloud platform through a wireless network, and is configured to send the acquired energy replenishment resource state information to the cloud platform, and further to receive information of the allocated order, and be set vacant in a reserved period according to the information of the order.

If this embodiment is applied to the field of electric vehicles, power replenishment resources are scheduled as the energy replenishment resources. The power replenishment resources may include one or more of a mobile charging vehicle, a battery swap station, a charging station, a private charging pile, and a public charging pile. The types of the power replenishment resources are not limited to the above, and the types of the power replenishment resources as scheduled objects do not affect the implementation of the technical solutions and the technical effects of the invention.

In order to more intelligently perform the valet energy replenishment reminding, in this embodiment, an energy replenishment demand analysis unit is further provided, which stores user history energy replenishment behavior information, analyzes and actively generates the energy replenishment demand information according to the user history energy replenishment behavior information, and an energy replenishment resource scheduling policy obtained from a scheduling policy center, and sends the energy replenishment demand information to the intelligent scheduling unit to allocate the corresponding energy replenishment resource.

In order to intelligently remind the user of the vehicle of the energy replenishment, in this embodiment, a vehicle state acquisition device is further provided, an energy replenishment reminder analysis unit is provided in the cloud platform, and at the same time, the first terminal is further provided with an energy replenishment reminding function.

The vehicle state acquisition device communicates with the external interface unit in the cloud platform through the wireless network, and is configured to acquire basic information of a vehicle and basic information of a user using the vehicle at a set acquisition frequency, and send the basic information of the vehicle and the basic information of the user using the vehicle to the resource management unit.

The basic information of the vehicle includes an available driving range of the vehicle, a real-time location of the vehicle and the real-time remaining energy, and the basic information of the user using the vehicle includes a next possible destination, and a departure time.

The energy replenishment reminder analysis unit is configured to calculate an estimated driving range of the vehicle and the available driving range of the vehicle according to the basic information of the vehicle and the basic information of the user using the vehicle, perform an energy replenishment judgment and generate an energy replenishment reminder information.

The first terminal is configured to receive the energy replenishment reminder information generated by the energy replenishment reminder analysis unit, and perform an energy replenishment reminding.

The valet energy replenishment action guidance in this embodiment may include the following three types:

(1) an information guidance, performed according to the energy replenishment order, of searching for a vehicle to be replenished with energy, driving the vehicle to be replenished with energy to a stationary power replenishment resource, replenishing the vehicle with energy, and returning the vehicle that has been replenished with energy to an original vehicle pick-up location;

(2) an information guidance, performed according to the energy replenishment order, of moving a non-stationary power replenishment resource to the vicinity of a vehicle to be replenished with energy, replenishing the vehicle with energy, completing the energy replenishment the vehicle, and moving the non-stationary power replenishment resource to a specified location after completing the service; and (3) an information guidance, performed according to the energy replenishment order, of automatically driving a vehicle to be replenished with energy to a stationary and/or non-stationary power replenishment resource, replenishing the vehicle with energy, and automatically driving the vehicle that has been replenished with energy to an original vehicle pick-up location.

The basic information of the energy replenishment resources in this embodiment is specifically the basic information of the power replenishment resources, which includes working parameters and working states, specifically including the basic information of the power replenishment resources such as real-time locations, working state information (in work, ready to work, faulty, etc.), various in-work and out-of-work technical parameters (input and/or output voltage, input and/or output current, input and/or output power, etc.) and real-time service capabilities, and may further includes power replenishment resource service capability prediction information.

The external interface unit of this embodiment comprises a wireless communication device, which may perform information interaction with the first terminal and the second terminal by using communication technology such as 3G/4G/5G, or by using wireless local area network technology (Wireless Fidelity, WiFi) based on the IEEE 802.11b standard, or by using a TCP communication approach, or by using a BT communication approach, or by using low-power local area network technology ZigBee based on the IEEE 802.15.4 standard.

In order to avoid duplication of characters, the description of this embodiment is not fully developed, and those skilled in the pertinent technical field can clearly understand that the corresponding technical details of this embodiment can refer to the corresponding description in the foregoing energy replenishment system, and will not described herein again.

It should be noted that the mobile Internet-based integrated vehicle energy replenishment system provided in the foregoing embodiments is only illustrated by the division of the above functional parts when performing the energy replenishment service. In practical applications, the above functions are allocated to different functional modules, centers, units and devices according to requirements, that is, the functional parts in the embodiments of the invention are further decomposed or combined, for example, the functional units (such as the resource management unit and the intelligent scheduling unit) in the foregoing embodiments may be combined into one functional unit, or further split into multiple sub-units to complete all or part of the functions described above. The names of the functional units and devices involved in the embodiments of the invention are merely for distinguishing purpose and are not to be construed as limiting the invention.

3. A third embodiment of a mobile Internet-based integrated vehicle energy replenishment system of the invention comprises a resource management unit and an intelligent scheduling unit.

The resource management unit comprises an energy replenishment resource management unit configured to obtain and store basic information of energy replenishment resources. The basic information of the energy replenishment resources has been described in the foregoing energy replenishment system, and will not be described herein again.

The intelligent scheduling unit comprises an energy replenishment resource scheduling unit configured to allocate an energy replenishment resource corresponding to a received energy replenishment demand information according to the received energy replenishment demand information and the latest working states of the energy replenishment resources stored in the energy replenishment resource management unit.

In this embodiment, the energy replenishment resource scheduling unit is further configured to actively schedule the energy replenishment resources according to historical usage data of the energy replenishment resources with the aim of maximizing the utilization efficiency of the energy replenishment resources within a specific area.

In this embodiment, the method for allocating the energy replenishment resource corresponding to the received energy replenishment demand information lies in that the energy replenishment resource is allocated by the energy replenishment resource scheduling unit according to the energy replenishment demand information; and if the allocated energy replenishment resource is abnormal and cannot provide the reserved energy replenishment service, reallocation is performed by the energy replenishment resource scheduling unit according to the initial energy replenishment demand information, and the allocated energy replenishment resource is updated.

In this embodiment, the intelligent scheduling unit is further provided with an energy replenishment reminder analysis unit. The energy replenishment reminder analysis unit is provided in the intelligent scheduling unit.

The energy replenishment reminder analysis unit is configured to perform an energy replenishment judgment according to an estimated driving range of the vehicle and the available driving range of the vehicle, and send an energy replenishment reminder information.

The energy replenishment reminder analysis unit is further configured to send an energy replenishment scheme generated according to the energy replenishment reminder information while sending an energy replenishment reminder. The method for generating the energy replenishment scheme is: using the energy replenishment reminder information as the energy replenishment demand information and allocating the energy replenishment resource by the energy replenishment resource scheduling unit.

The estimated driving range of the vehicle is determined according to the following three methods:

(1) according to a driving destination of the vehicle;

(2) according to customary driving routes derived from the statistical analysis of historical data; and (3) according to a driving range within a set period of time that is derived from the statistical analysis of the historical data.

The basic information of the energy replenishment resources in this embodiment is specifically the basic information of the power replenishment resources, which includes working parameters and working states, specifically including the basic information of the power replenishment resources such as real-time locations, working state information (in work, ready to work, faulty, etc.), various in-work and out-of-work technical parameters (input and/or output voltage, input and/or output current, input and/or output power, etc.) and real-time service capabilities, and may further includes power replenishment resource service capability prediction information.

In this embodiment, the intelligent scheduling unit is further provided with an energy replenishment type recommendation unit, which is configured to list and send feasible energy replenishment types according to the energy replenishment demand information and the usable energy replenishment resources within a set duration required in the energy replenishment demand information.

The energy replenishment types are divided according to an available energy replenishment duration which is the set duration in the energy replenishment demand information. Specifically, the energy replenishment types may be divided into a fast energy replenishment service and an economic energy replenishment service by using a set duration threshold A. The available energy replenishment duration of the fast energy replenishment service may be set to be less than or equal to the set threshold A, and the economy energy replenishment duration of the energy replenishment service be greater than the set threshold A.

In this embodiment, the intelligent scheduling unit is further provided with an energy replenishment demand analysis unit. The energy replenishment demand analysis unit is configured to analyze and actively generate the energy replenishment demand information according to user history energy replenishment behavior information and a set energy replenishment resource scheduling policy, and send the energy replenishment demand information to the energy replenishment resource scheduling unit to allocate the corresponding energy replenishment resource.

In this embodiment, a first terminal is further comprised. The first terminal is provided with an energy replenishment reminding unit, which is configured to perform an energy replenishment reminding according to the energy replenishment reminder information sent by the energy replenishment reminder analysis unit.

In this embodiment, a second terminal is further comprised, and the intelligent scheduling unit further comprises an order generation unit. The order generation unit is configured to allocate the energy replenishment resource by the intelligent scheduling unit, and generate an energy replenishment order by using a valet energy replenishment request as the energy replenishment demand information; and the second terminal is configured to obtain the allocated energy replenishment order and perform an energy replenishment action information guidance. The way in which the energy replenishment action information guidance is performed has been described in the foregoing energy replenishment system, and will not be described herein again.

If the second terminal is comprised in this embodiment, the service process of the valet energy replenishment may be implemented. In this case, in order to facilitate the user to view the service situation, the first terminal is further provided with an order status displaying unit configured to obtain and display the status information of the energy replenishment order of the corresponding vehicle.

If this embodiment is applied to the field of power replenishment of electric vehicles, the types of the energy replenishment resources have been described in the foregoing energy replenishment system, and will not be described herein again.

The information of the energy replenishment resources obtained in this embodiment has been described in the foregoing energy replenishment system, and will not be described herein again.

The description of the configuration of the energy replenishment resource types by the energy replenishment resource scheduling unit according to the corresponding area classification has been described in the foregoing energy replenishment system, and will not be described herein again.

In this embodiment, the intelligent scheduling unit is further provided with a parking spot navigation unit, which has been described in the foregoing energy replenishment system, and will not be described herein again.

In this embodiment, a vehicle keyless authorization system is further comprised, which has been described in the foregoing energy replenishment system, and will not be described herein again.

In this embodiment, the resource management unit further comprises a vehicle management unit, which has been described in the foregoing energy replenishment system, and will not be described herein again.

In order to avoid duplication of characters, the description of this embodiment is not fully developed, and those skilled in the pertinent technical field can clearly understand that the corresponding technical details of this embodiment can refer to the corresponding description in the foregoing energy replenishment system, and will not described herein again.

It should be noted that the mobile Internet-based integrated vehicle energy replenishment system provided in the foregoing embodiments is only illustrated by the division of the above functional parts when performing the energy replenishment service. In practical applications, the above functions are allocated to different functional modules, centers, units and devices according to requirements, that is, the functional parts in the embodiments of the invention are further decomposed or combined, for example, the functional units (such as the resource management unit and the intelligent scheduling unit) in the foregoing embodiments may be combined into one functional unit, or further split into multiple sub-units to complete all or part of the functions described above. The names of the functional units and devices involved in the embodiments of the invention are merely for distinguishing purpose and are not to be construed as limiting the invention.

Figure 5:
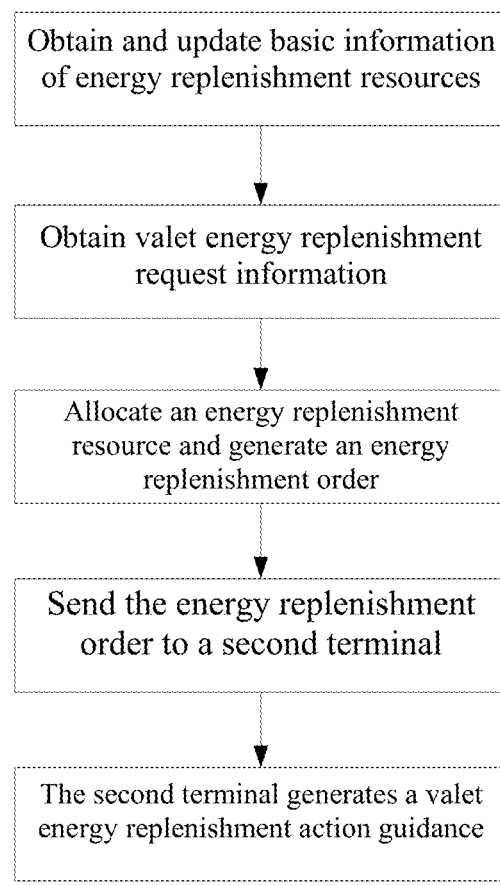
FIG. 5 is a schematic flow chart of a mobile Internet-based integrated vehicle energy replenishment method of an embodiment of the invention.

4. In a first embodiment of a mobile Internet-based integrated vehicle energy replenishment method of the invention, as shown in FIG. 5, the following steps are disclosed:

obtaining and updating basic information of energy replenishment resources;

obtaining valet energy replenishment request information;

allocating an energy replenishment resource corresponding to the valet energy replenishment request information according to the obtained valet energy replenishment request information and the latest working states of the energy replenishment resources in the basic information of the energy replenishment resources, generating an energy replenishment order, and sending the energy replenishment order to the second terminal; and the second terminal generating a valet energy replenishment action guidance according to the received energy replenishment order.

The way in which the energy replenishment action information guidance is performed has been described in the foregoing energy replenishment system, and will not be described herein again.

In this embodiment, the valet energy replenishment request information is inputted from a first terminal, or is actively generated through an energy replenishment demand analysis.

the energy replenishment demand analysis comprises: analyzing and actively generating energy replenishment demand information according to user history energy replenishment behavior information and a set energy replenishment resource scheduling policy, and using the generated energy replenishment demand information to as the valet energy replenishment request information.

In this embodiment, the following steps of the energy replenishment reminding are further comprised:

acquiring basic information of a vehicle and basic information of a user using the vehicle at a set acquisition frequency, wherein the basic information of the vehicle includes an available driving range of the vehicle, a real-time location of the vehicle and the real-time remaining energy, and the basic information of the user using the vehicle includes a next possible destination, and a departure time;

calculating an estimated driving range of the vehicle and the available driving range of the vehicle according to the basic information of the vehicle and the basic information of the user using the vehicle, performing an energy replenishment judgment, and generating an energy replenishment reminder information when the difference between the available driving range of the vehicle and the estimated driving range of the vehicle is less than a set threshold; and sending energy replenishment reminder information to the first terminal for performing the energy replenishment reminding.

The basic information of the energy replenishment resources in this embodiment is specifically the basic information of the power replenishment resources, which includes working parameters and working states, specifically including the basic information of the power replenishment resources such as real-time locations, working state information (in work, ready to work, faulty, etc.), various in-work and out-of-work technical parameters (input and/or output voltage, input and/or output current, input and/or output power, etc.) and real-time service capabilities, and may further includes power replenishment resource service capability prediction information.

Although the steps are described in the foregoing order in this embodiment, those skilled in the art can understand that in order to achieve the effects of this embodiment, different steps are not necessarily performed in this order, but can be performed simultaneously (in parallel) or in reverse order, and these simple variations are within the scope of protection of the invention.

It will be clearly understood by those skilled in the art that for the convenience and brevity of the description, the specific working process and related illustration of the method as described above can refer to the corresponding process in the foregoing embodiment of the energy replenishment system, which will not be repeated herein again.

5. In a second embodiment of a mobile Internet-based integrated vehicle energy replenishment method of the invention, the following steps are disclosed:

resource management: obtaining and storing basic information of energy replenishment resources; and energy replenishment resource scheduling: allocating an energy replenishment resource corresponding to the energy replenishment demand information according to the obtained energy replenishment demand information and the latest working states of the energy replenishment resources in the basic information of the energy replenishment resources.

In this embodiment, the energy replenishment demand information is inputted by a remote terminal device, or is actively generated through an energy replenishment demand analysis.

The energy replenishment demand analysis comprises: analyzing and actively generating the energy replenishment demand information according to user history energy replenishment behavior information and a set energy replenishment resource scheduling policy.

The energy replenishment method of this embodiment further comprises energy replenishment reminder analysis and energy replenishment reminding.

The energy replenishment reminder analysis comprises: performing an energy replenishment judgment according to an estimated driving range of the vehicle and the available driving range of the vehicle, and sending an energy replenishment reminder information.

The energy replenishment reminding comprises: performing an energy replenishment reminding according to the energy replenishment reminder information sent by the energy replenishment reminder analysis unit.

The energy replenishment reminder analysis further comprises: sending an energy replenishment scheme generated according to the energy replenishment reminder information while sending an energy replenishment reminder.

Here, the method for generating the energy replenishment scheme is: using the energy replenishment reminder information as the energy replenishment demand information and allocating the energy replenishment resource by the energy replenishment resource scheduling unit.

In this embodiment, the estimated driving range of the vehicle is determined according to a driving destination of the vehicle, or according to customary driving routes derived from the statistical analysis of historical data, or according to a driving range within a set period of time that is derived from the statistical analysis of the historical data.

The energy replenishment method of this embodiment further comprises energy replenishment type recommendation: listing feasible energy replenishment types according to the energy replenishment demand information and the usable energy replenishment resources within a set duration required in the energy replenishment demand information, and sending the feasible energy replenishment types to a human-machine interaction interface of a first terminal.

The energy replenishment types are divided according to an available energy replenishment duration which is the set duration in the energy replenishment demand information.

Specifically, the energy replenishment types may be divided into a fast energy replenishment service and an economic energy replenishment service according to a set duration threshold A, wherein the available energy replenishment duration of the fast energy replenishment service is less than or equal to the set threshold A; and the available energy replenishment duration of the economic energy replenishment service is greater than the set threshold A.

In this embodiment, in the steps of the energy replenishment resource scheduling, the allocation of the energy replenishment resource corresponding to the energy replenishment demand information specifically lies in that the energy replenishment resource is selected and allocated according to the energy replenishment demand information; and if the allocated energy replenishment resource is abnormal and cannot provide the reserved energy replenishment service, reallocation is performed on the energy replenishment resources according to the initial energy replenishment demand information, and the allocated energy replenishment resource is updated.

Further, the energy replenishment resource scheduling is actively scheduling the energy replenishment resources according to historical usage data of the energy replenishment resources with the aim of maximizing the utilization efficiency of the energy replenishment resources within a specific area.

If this embodiment is applied to the field of power replenishment of electric vehicles, the energy replenishment resources are power replenishment resources. The types of the power replenishment resources have been described in the foregoing energy replenishment system, and will not be described herein again.

Further, in the method of this embodiment, service capability prediction information of the energy replenishment resources is further obtained and stored after the basic information of the energy replenishment resources is obtained; and the information according to which the energy replenishment resource corresponding to the energy replenishment demand information is allocated comprises: the obtained service capability prediction information of the energy replenishment resources.

In this embodiment, the energy replenishment resource scheduling further comprises configuring the energy replenishment resource types according to a corresponding area classification. The configuration of the area classification, the power replenishment resource types, and the power replenishment resource types have been described in the foregoing energy replenishment system, and will not be described herein again.

The energy replenishment method of this embodiment further comprises allocating the energy replenishment resource and generating an energy replenishment order by using a valet energy replenishment request as the energy replenishment demand information, and sending the energy replenishment order to a second terminal for an action guidance. The way in which the energy replenishment action information guidance is performed has been described in the foregoing energy replenishment system, and will not be described herein again.

In the energy replenishment method of this embodiment, the intelligent scheduling further comprises sending a vehicle search navigation scheme to the second terminal according to vehicle positioning information. The specific content of the vehicle search navigation scheme is consistent with the specific description of the parking spot navigation unit in the foregoing energy replenishment system, and will not be described herein again.

The energy replenishment method of this embodiment further comprises a vehicle keyless authorization, wherein the method for the vehicle keyless authorization system is: operating the vehicle within an authorized range according to an authorized control instruction when the second terminal is within a set distance of the corresponding vehicle.

The implementation of the keyless authorization relies on the keyless authorization system in the foregoing energy replenishment system. In order to realize the operation of the keyless authorization, a series of preliminary setting steps are required, specifically such as the functional description of the units and terminals in the keyless authorization system in the foregoing supplementary system, and comprise:

setting the vehicle authorization information by the first terminal, and sending the vehicle authorization information to the vehicle authorization control system and the automatic authorization unit respectively for storage purpose.

The vehicle authorization control module is configured to store the vehicle authorization information, and send the corresponding vehicle authorization information to the corresponding second terminal.

The second terminal obtains and stores the corresponding vehicle authorization information.

In order to facilitate the user's grasp of the order status, the first terminal is further configured to obtain and display the status information of the energy replenishment order of the corresponding vehicle.

In this embodiment, the resource management further comprises vehicle management, which comprises acquiring basic information of the vehicle and basic information of a user using the vehicle for the intelligent scheduling unit to retrieve. The basic information of the vehicle and the basic information of the energy replenishment resources have been described in the foregoing energy replenishment system, and will not be described herein again.

The basic information of the energy replenishment resources in this embodiment is specifically the basic information of the power replenishment resources, which includes working parameters and working states, specifically including the basic information of the power replenishment resources such as real-time locations, working state information (in work, ready to work, faulty, etc.), various in-work and out-of-work technical parameters (input and/or output voltage, input and/or output current, input and/or output power, etc.) and real-time service capabilities, and may further includes power replenishment resource service capability prediction information.

Although the steps are described in the foregoing order in this embodiment, those skilled in the art can understand that in order to achieve the effects of this embodiment, different steps are not necessarily performed in this order, but can be performed simultaneously (in parallel) or in reverse order, and these simple variations are within the scope of protection of the invention.

It will be clearly understood by those skilled in the art that for the convenience and brevity of the description, the specific working process and related illustration of the method as described above can refer to the corresponding process in the foregoing embodiment of the energy replenishment system, which will not be repeated herein again.

6. A first embodiment of s storage medium of the invention stores a plurality of programs adapted to be loaded by a processor and to implement the content of the first embodiment of the mobile Internet-based integrated vehicle energy replenishment method as described above.

It will be clearly understood by those skilled in the art that for the convenience and brevity of the description, the content of the programs in the storage medium as described above can refer to the corresponding description of the foregoing embodiment of the energy replenishment method, which will not be repeated herein again.

7. A second embodiment of s storage medium of the invention stores a plurality of programs adapted to be loaded by a processor and to implement the content of the second embodiment of the mobile Internet-based integrated vehicle energy replenishment method as described above.

The programs stored in the storage medium in this embodiment are further adapted to be loaded by the processor and to execute a program of performing information interaction with the first terminal and the second terminal.

The program of performing information interaction with the first terminal comprises: receiving an energy replenishment request sent by a first terminal.

The program of performing information interaction with the second terminal comprises: sending an energy replenishment order to a second terminal.

The first terminal stores a plurality of programs adapted to be loaded by a processor and to perform an energy replenishment reminding according to received energy replenishment reminder information.

The second terminal stores a plurality of programs adapted to be loaded by a processor and to perform an energy replenishment action information guidance. The way in which the energy replenishment action information guidance is performed has been described in the foregoing energy replenishment system, and will not be described herein again.

It will be clearly understood by those skilled in the art that for the convenience and brevity of the description, the content of the programs in the storage medium as described above can refer to the corresponding description of the foregoing embodiment of the energy replenishment method, which will not be repeated herein again.

8. A fourth embodiment of a mobile Internet-based integrated vehicle energy replenishment system of the invention comprises a processor adapted to execute various programs; and a storage apparatus adapted to store a plurality of programs, wherein the programs are adapted to be loaded by a processor and to implement the content of the first embodiment of the mobile Internet-based integrated vehicle energy replenishment method as described above.

It will be clearly understood by those skilled in the art that for the convenience and brevity of the description, the content of the programs in the energy replenishment system as described above can refer to the corresponding description of the foregoing embodiment of the energy replenishment method, which will not be repeated herein again.

9. A fifth embodiment of a mobile Internet-based integrated vehicle energy replenishment system of the invention comprises a processor adapted to execute various programs; and a storage apparatus adapted to store a plurality of programs, wherein the programs are adapted to be loaded by a processor and to implement the content of the second embodiment of the mobile Internet-based integrated vehicle energy replenishment method as described above.

The programs stored in the storage medium in this embodiment are further adapted to be loaded by the processor and to execute a program of performing information interaction with the first terminal and the second terminal.

The program of performing information interaction with the first terminal comprises: receiving an energy replenishment request sent by a first terminal.

The program of performing information interaction with the second terminal comprises: sending an energy replenishment order to a second terminal.

The first terminal comprises a processor adapted to execute various programs; and a storage apparatus adapted to store a plurality of programs, wherein the programs are adapted to be loaded by the processor and to perform an energy replenishment reminding according to received energy replenishment reminder information.

The second terminal comprises a processor adapted to execute various programs; and a storage apparatus adapted to store a plurality of programs, wherein the programs are adapted to be loaded by the processor and to perform an energy replenishment action information guidance. The way in which the energy replenishment action information guidance is performed has been described in the foregoing energy replenishment system, and will not be described herein again.

It will be clearly understood by those skilled in the art that for the convenience and brevity of the description, the content of the programs in the energy replenishment system as described above can refer to the corresponding description of the foregoing embodiment of the energy replenishment method, which will not be repeated herein again.

The storage medium in the foregoing embodiments refers to a carrier for storing data, and may be a floppy disk, an optical disk, a DVD, a hard disk, a flash memory, a USB flash disk, a CF card, an SD card, an MMC card, an SM card, a memory stick, an xD card, etc.

The terms "first," "second," etc. are used to distinguish similar objects, and are not intended to describe or indicate a particular sequence or order.

The term "comprise" or any other similar terms are intended to cover a non-exclusive inclusion, so that a process, method, article or apparatus/device that comprises a series of elements not only comprises those elements but may also comprise other elements not expressly listed or inherent to such a process, method, article, or apparatus/device.

Those skilled in the art should be able to realize that the modules, units and method steps of the various examples described in connection with the embodiments disclosed herein can be implemented in electronic hardware, computer software or a combination of both. To clearly illustrate the interchangeability of electronic hardware and software, the compositions and steps of the various examples have been generally described in terms of functionality in the above description. Whether these functions are performed in electronic hardware or software depends on the specific application and design constraints of the technical solution. Those skilled in the art can use different methods to implement the described functions for each particular application, but such implementation should not be considered to be beyond the scope of the invention.

Heretofore, the technical solutions of the invention have been described with reference to the preferred embodiments shown in the accompanying drawings; however, those skilled in the art can readily understand that the scope of protection of the invention is obviously not limited to these particular embodiments. Without departing from the principle of the invention, a person skilled in the art may make equivalent changes or substitutions on related technical features, and the technical solutions after these changes or substitutions fall into the scope of protection of the invention.

What is claimed is:

1. A mobile Internet-based integrated vehicle energy replenishment method, implemented by a system which comprises a first terminal, a second terminal, an intelligent scheduling unit, and a resource management unit, wherein the first terminal and the second terminal communicate with the intelligent scheduling unit and the resource management unit via a wireless communication manner and the intelligent scheduling unit comprises an energy replenishment type recommendation unit and an energy replenishment resource scheduling unit, the method comprising:
   sending a valet energy replenishment request information to the intelligent scheduling unit by the first terminal, wherein a duration is set in the request information;
   obtaining and storing basic information of energy replenishment resources by the resource management unit;
   by the energy replenishment type recommendation unit, listing and sending feasible energy replenishment types to the first terminal according to the energy replenishment request information and the usable energy replenishment resources within the set duration;
   receiving a selection of an energy replenishment type from the feasible energy replenishment types by the first terminal;
   in response to the selection, by the intelligent scheduling unit, allocating an energy replenishment resource corresponding to the valet energy replenishment request information according to the obtained valet energy replenishment request information and the latest working states of the energy replenishment resources in the basic information of the energy replenishment resources, generating an energy replenishment order, and sending the energy replenishment order to the second terminal; and
   by the second terminal, generating a valet energy replenishment action guidance according to the received energy replenishment order and providing the valet energy replenishment action guidance for a valet power replenishment service personnel to guide the valet power replenishment service personnel to complete the valet energy replenishment of a vehicle to be replenished.

2. The method according to claim 1, wherein the system further comprises an energy replenishment demand analysis unit and wherein the valet energy replenishment request information is actively generated through an energy replenishment demand analysis by the energy replenishment demand analysis unit, wherein the energy replenishment demand analysis comprises: analyzing and actively generating energy replenishment demand information according to user history energy replenishment behavior information and a set energy replenishment resource scheduling policy, and using the generated energy replenishment demand information as the valet energy replenishment request information.

3. The method according to claim 1, wherein the system further comprises a vehicle state acquisition device, and the intelligent scheduling unit further comprises an energy replenishment reminder analysis unit, and wherein the method further comprises energy replenishment reminding, comprising the following steps:

by the vehicle state acquisition device, acquiring basic information of a vehicle and basic information of a user using the vehicle at a set acquisition frequency, wherein the basic information of the vehicle includes an available driving range of the vehicle, a real-time location of the vehicle and the real-time remaining energy, and the basic information of the user using the vehicle includes a next possible destination, and a departure time;

by the energy replenishment reminder analysis unit, calculating an estimated driving range of the vehicle and the available driving range of the vehicle according to the basic information of the vehicle and the basic information of the user using the vehicle, performing an energy replenishment judgment, and generating an energy replenishment reminder information when a difference between the available driving range of the vehicle and the estimated driving range of the vehicle is less than a set threshold; and sending energy replenishment reminder information to the first terminal for performing the energy replenishment reminding by the energy replenishment reminder analysis unit.

4. The method according to claim 1, wherein the valet energy replenishment action guidance is:

an information guidance, performed according to the energy replenishment order, of searching for a vehicle to be replenished with energy, driving the vehicle to be replenished with energy to a stationary power replenishment resource, replenishing the vehicle with energy, and returning the vehicle that has been replenished with energy to an original vehicle pick-up location.

5. A mobile Internet-based integrated vehicle energy replenishment system, comprising:

a first terminal, a second terminal, an intelligent scheduling unit, and a resource management unit, wherein the intelligent scheduling unit comprises an energy replenishment type recommendation unit and an energy replenishment resource scheduling unit, wherein the first terminal is configured to send a valet energy replenishment request information to the intelligent scheduling unit, wherein a duration is set in the request;

the resource management unit is configured to obtain and store basic information of energy replenishment resources;

the energy replenishment type recommendation unit is configured to list and send feasible energy replenishment types to the first terminal according to the energy replenishment request information and the usable energy replenishment resources within the set duration;

the first terminal is configured to select an energy replenishment type from the feasible energy replenishment types;

the intelligent scheduling unit is configured to, in response to the selection, allocate an energy replenishment resource corresponding to the valet energy replenishment request information according to the obtained valet energy replenishment request information and the latest working states of the energy replenishment resources in the basic information of the energy replenishment resources, generate an energy replenishment order, and send the energy replenishment order to the second terminal; and the second terminal is configured to generate a valet energy replenishment action guidance according to the received energy replenishment order and provide the valet energy replenishment action guidance for a valet power replenishment service personnel to guide the valet power replenishment service personnel to complete the valet energy replenishment of a vehicle to be replenished.

* * * * *